(12) United States Patent
Yin et al.

(10) Patent No.: US 8,817,705 B2
(45) Date of Patent: Aug. 26, 2014

(54) METHOD, APPARATUS AND SYSTEM FOR TRANSMITTING USER PLANE DATA

(75) Inventors: Yu Yin, Shanghai (CN); Weihua Hu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 46 days.

(21) Appl. No.: 13/335,989

(22) Filed: Dec. 23, 2011

(65) Prior Publication Data

US 2012/0093086 A1 Apr. 19, 2012

Related U.S. Application Data

(63) Continuation of application No. PCT/CN2010/073136, filed on May 24, 2010.

(30) Foreign Application Priority Data

Jun. 26, 2009 (CN) .......................... 2009 1 0088363

(51) Int. Cl.
*H04W 4/00* (2009.01)
*H04L 29/06* (2006.01)
*H04W 76/02* (2009.01)

(52) U.S. Cl.
CPC ............. *H04W 76/02* (2013.01); *H04L 69/16* (2013.01)
USPC ...................................... 370/328

(58) Field of Classification Search
CPC ..... H04L 69/16–69/169; H04W 76/02–76/028
USPC .......... 370/311, 329, 346, 348, 496; 455/466, 455/458
See application file for complete search history.

(56) References Cited

U.S. PATENT DOCUMENTS

| 5,799,251 | A | 8/1998 | Paavonen |
| 6,198,936 | B1 | 3/2001 | Yang et al. |
| 8,228,852 | B2 * | 7/2012 | Yi et al. ........................ 370/329 |

(Continued)

FOREIGN PATENT DOCUMENTS

| CN | 1450780 A | 10/2003 |
| CN | 1864152 A | 11/2006 |

(Continued)

OTHER PUBLICATIONS

Second Office Action of Chinese Application No. 200910088363.4 mailed Jan. 21, 2013, 13 pages. (Partial Translation).

(Continued)

*Primary Examiner* — Paul H Masur
*Assistant Examiner* — Kabir Jahangir
(74) *Attorney, Agent, or Firm* — Slater & Matsil, L.L.P.

(57) ABSTRACT

Receiving a connection establishment request message sent by a user equipment; establishing a signaling connection with the user equipment according to the connection establishment request message; and transmitting a user plane IP data packet through the signaling connection. After a signaling connection is established between a UE in an idle state and a mobility management device, an uplink user plane IP data packet or a downlink user plane IP data packet, is directly transmitted between the UE and the network side through the signaling connection, with no need to specifically establish (recover) an RAB between the UE and an S-GW, which can save the signaling overhead, thus reducing the network load and lowering the operating cost of an operator.

20 Claims, 11 Drawing Sheets

(56) References Cited

U.S. PATENT DOCUMENTS

| | | | |
|---|---|---|---|
| 2002/0001291 A1* | 1/2002 | Willars et al. | 370/329 |
| 2005/0002407 A1 | 1/2005 | Shaheen et al. | |
| 2005/0117540 A1 | 6/2005 | Kuchibhotla et al. | |
| 2005/0288048 A1 | 12/2005 | Rosen et al. | |
| 2007/0060154 A1 | 3/2007 | Landschaft et al. | |
| 2007/0259675 A1* | 11/2007 | Worrall | 455/458 |
| 2008/0311913 A1* | 12/2008 | Thiebaut et al. | 455/436 |
| 2008/0311923 A1* | 12/2008 | Petrovic et al. | 455/450 |

FOREIGN PATENT DOCUMENTS

| | | | | |
|---|---|---|---|---|
| CN | 101047630 A | 10/2007 | | |
| CN | 101064906 A | 10/2007 | | |
| CN | 101136835 A | 3/2008 | | |
| CN | 101388689 A | 3/2009 | | |
| EP | 1353528 A1 * | 10/2003 | | H04Q 11/04 |
| EP | 1843560 A2 | 10/2007 | | |
| EP | 2182328 A1 | 5/2010 | | |
| GB | 2314738 A | 1/1998 | | |
| WO | WO 93/10643 | 5/1993 | | |
| WO | WO 95/24791 | 9/1995 | | |
| WO | WO 01/98863 A2 | 12/2001 | | |
| WO | WO 02/30084 A1 | 4/2002 | | |

OTHER PUBLICATIONS

Chinese Office Action and Partial Translation received in Chinese Patent Application No. 200910088363.4, mailed May 3, 2012, 9 pages.

Supplementary European Search Report received in European Patent Application No. 10791373.3-2414, mailed Mar. 21, 2012, 9 pages.

International Search Report and Translation received in the Patent Cooperation Treaty Application No. PCT/CN2010/073136, mailed Sep. 2, 2010, 8 pages.

Written Opinion of the International Searching Authority and Translation received in Patent Cooperation Treaty Application No. PCT/CN2010/073136, mailed Sep. 2, 2010, 12 pages.

* cited by examiner

METHOD, APPARATUS AND SYSTEM FOR TRANSMITTING USER PLANE DATA

CROSS-REFERENCE TO RELATED APPLICATIONS

This application is a continuation of International Application No. PCT/CN2010/073136, filed on May 24, 2010, which claims priority to Chinese Patent Application No. 200910088363.4, filed on Jun. 26, 2009, all of which are hereby incorporated by reference in their entireties.

FIELD OF THE INVENTION

The present invention relates to the field of mobile communication technologies, and in particular, to a method, an apparatus and a system for transmitting user plane data.

BACKGROUND OF THE INVENTION

In an IP mobile bearer network, that is, a mobile packet bearer network, in order to save a radio resource and reduce power consumption of a user equipment, when the user equipment (User Equipment, abbreviated as UE) has no service interaction (that is, signaling interaction and user plane data transmission) with the network for a period of time (for example, 30 seconds), the network releases a signaling connection and a user plane bearer between a radio interface side and the UE, and at this time, the UE is in an idle state (Idle State); when the UE needs to send or receive user plane data, the UE first recovers a signaling connection with the network, recovers a user plane bearer through the signaling connection, and sends or receives the user plane data through the recovered user plane bearer, and at this time, the UE is in a connected state (Connected State).

However, because some services of small data volumes, for example, short message service (Short Message Service, abbreviated as SMS), only need to transmit a few user plane IP data packets carrying SMS content each time, the UE in the idle state, when implementing the services of small data volumes, needs to perform a corresponding signaling process each time to establish (recover) a radio interface side user plane bearer, that is, a radio access bearer (Radio Access Bearer, abbreviated as RAB), which increases the signaling overhead, thus increasing the network load and the operating cost of an operator.

SUMMARY OF THE INVENTION

Embodiments of the present invention provide a method, an apparatus and a system for transmitting user plane data, so as to save the signaling overhead, reduce the network load, and lower the operating cost of an operator.

An embodiment of the present invention provides a method for transmitting user plane data, where the method includes:

receiving a connection establishment request message sent by a user equipment;

establishing a signaling connection with the user equipment according to the connection establishment request message; and transmitting a user plane IP data packet through the signaling connection.

An embodiment of the present invention further provides a mobility management device, including:

a first receiving module, configured to receive a connection establishment request message sent by a user equipment;

an establishing module, configured to establish a signaling connection with the user equipment according to the connection establishment request message; and a first transmitting module, configured to transmit a user plane IP data packet through the signaling connection.

An embodiment of the present invention further provides a UE, including:

a request module, configured to send a connection establishment request message to a mobility management device, so that the mobility management device establishes a signaling connection with the user equipment; and a second transmitting module, configured to transmit a user plane IP data packet through the signaling connection.

An embodiment of the present invention further provides an access gateway, including:

a second receiving module, configured to receive a user plane IP data packet; and a first sending module, configured to send the user plane IP data packet to a mobility management device, so that the mobility management device establishes a signaling connection with a user equipment and transmits the user plane IP data packet through the signaling connection.

An embodiment of the present invention further provides another access gateway, including:

a second buffer module, configured to buffer a received user plane IP data packet; and a second sending module, configured to send a downlink data notification message to a mobility management device, where the downlink data notification message includes indication information indicating that a user plane IP data packet is transmitted through a signaling connection, so as to page a user equipment and trigger the user equipment to send a connection establishment request message; and send the user plane IP data packet to the mobility management device after the mobility management device establishes a signaling connection with the user equipment according to the connection establishment request message, so that the mobility management device transmits the user plane IP data packet through the signaling connection.

An embodiment of the present invention further provides another access gateway, including:

a third buffer module, configured to buffer a received user plane IP data packet; and a third sending module, configured to send a downlink data notification message to a mobility management device, so as to page a user equipment and trigger the user equipment to send a connection establishment request message; and send the user plane IP data packet to the mobility management device according to a received downlink data delivery notification message sent by the mobility management device after the mobility management device establishes a signaling connection with the user equipment according to the connection establishment request message, where the downlink data delivery notification message includes indication information indicating that a user plane IP data packet is transmitted through a signaling connection, so that the mobility management device transmits the user plane IP data packet through the signaling connection.

An embodiment of the present invention further provides a system for transmitting user plane data, where the system includes:

an access network device, configured to receive a connection establishment request message sent by a user equipment, and send the connection establishment request message; and a mobility management device, configured to receive the connection establishment request message sent by the access network device, establish a signaling connection with the user equipment according to the connection establishment request message, and transmit a user plane IP data packet through the signaling connection.

BRIEF DESCRIPTION OF THE DRAWINGS

To illustrate the technical solutions according to the embodiments of the present invention or in the prior art more clearly, accompanying drawings required for describing the embodiments or the prior art are introduced below briefly. Apparently, the accompanying drawings in the following descriptions are merely some embodiments of the present invention, and persons of ordinary skill in the art may further obtain other drawings according to the accompanying drawings without creative efforts.

DETAILED DESCRIPTION OF THE EMBODIMENTS

The technical solutions according to the embodiments of the present invention are clearly and fully described in the following with reference to the accompanying drawings in the embodiments of the present invention. Obviously, the embodiments to be described are only part of rather than all of the embodiments of the present invention. All other embodiments obtained by persons of ordinary skill in the art based on the embodiments of the present invention without creative efforts shall fall within the protection scope of the present invention.

The following embodiments of the present invention are applicable to mobile packet communication systems where a radio interface side adopts a signaling channel and a user plane channel which are independent of each other to transmit control messages and user plane messages respectively, where the mobile packet communication systems may include a general packet radio service (General Packet Radio Service, abbreviated as GPRS) network, a universal mobile telecommunication system (Universal Mobile Telecommunication System, abbreviated as UMTS) network, an evolved packet system (Evolved Packet System, abbreviated as EPS) network, a world interoperability for microwave access (World Interoperability for Microwave Access, abbreviated as WiMAX) system network, and a code division multiple access (Code Division Multiple Access, abbreviated as CDMA) network.

Figure 1:
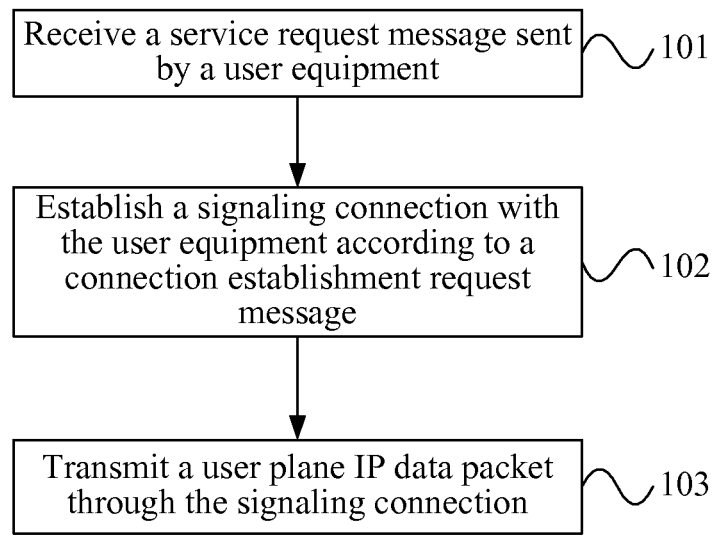
FIG. 1 is a schematic flowchart of a method for transmitting user plane data according to a first embodiment of the present invention.

FIG. 1 is a schematic flowchart of a method for transmitting user plane data according to a first embodiment of the present invention. As shown in FIG. 1, the method for transmitting user plane data according to this embodiment includes the following steps:

Step 101: Receive a connection establishment request message sent by a UE.

Step 102: Establish a signaling connection with the UE according to the connection establishment request message.

Step 103: Transmit a user plane IP data packet through the signaling connection.

A mobile packet bearer network is generally a system where a control plane and a user plane are separated, and in order to save radio network resources and reduce power consumption of a UE, when no service interaction is performed, the network removes a control plane channel (signaling connection) and a user plane channel (user plane bearer) that are between the network and the UE, so as to enable the UE to be in an idle state. The method for transmitting user plane data provided in this embodiment may be triggered by the UE in the idle state actively, that is, the UE actively sends a connection establishment request message to a mobility management device through an access network device, and at this time, it indicates that the UE in the idle state needs to actively send an uplink user plane IP data packet, and establishes a radio interface side signaling connection through actively initiating a connection establishment request by the UE; or may be triggered by the UE in the idle state passively according to paging of a network side, that is, after receiving a downlink data notification message or a downlink user plane IP data packet, where the downlink data notification message or the downlink user plane IP data packet is sent by an access gateway, a mobility management device pages a corresponding UE through an access network device, and triggers the UE to passively send a connection establishment request message to the mobility management device through the access network device, and at this time, it indicates that the network side receives the downlink user plane IP data packet sent to the UE in the idle state, and establishes a radio interface side signaling connection through paging the UE by the network side to passively initiate a connection establishment request.

In this embodiment, after a signaling connection is established between the UE in the idle state and the network side, that is, the mobility management device, an uplink user plane IP data packet or a downlink user plane IP data packet, where the uplink user plane IP data packet or the downlink user plane IP data packet carries service content is directly transmitted between the UE and the network side through the signaling connection, with no need to specifically establish (recover) a radio interface side user plane bearer, that is, an RAB, between the UE and the network side, that is, an S-GW, which can save the signaling overhead, thus reducing the network load and lowering the operating cost of an operator.

In this embodiment, the access network device may be a network element such as an evolved NodeB (eNB), a Radio Network Controller (Radio Network Controller, abbreviated as RNC), or a base station controller (Base Station Controller, abbreviated as BSC); the mobility management device may be a network element such as a mobility management entity (Mobility Management Entity, abbreviated as MME), a serving GPRS support node (Serving GPRS Support Node, abbreviated as SGSN), or an access service network-gateway (Access Service Network-Gateway, abbreviated as ASN-GW); and the access gateway may be a network element such as a serving gateway (Serving Gateway, abbreviated as S-GW), a gateway GPRS support node (Gateway GPRS Support Node, abbreviated as GGSN), or an ASN-GW.

The connection establishment request message is implemented through specific messages in different communication system networks, for example, in a communication system network such as a GPRS network, a UMTS network or an EPS network, is referred to as a service request (Service Request) message, and sent from the UE to an MME or an SGSN through a radio access network; in a WiMax system network, the connection establishment request message has different names at two ends, where the two ends are from the UE to the radio access network and from the radio access network to a core network, where the message from the UE to the radio access network is referred to as a ranging request (Ranging Request) message, and meanwhile, the UE sets a ranging purpose indication (Ranging Purpose Indication) in the message as 1; the message is referred to as an idle mode exit state change request (IM_Exit_State_Change_Req) message when being sent from the radio access network to the core network (ASN-GW).

It should be noted that, with the evolution of network architecture in future, the network entities may be integrated or divided. For example, the possibility of integrating the mobility management device in the access network device in future is not excluded.

The technical solutions according to the embodiments of the present invention are described in detail below by taking an EPS network as an example.

Figure 2:
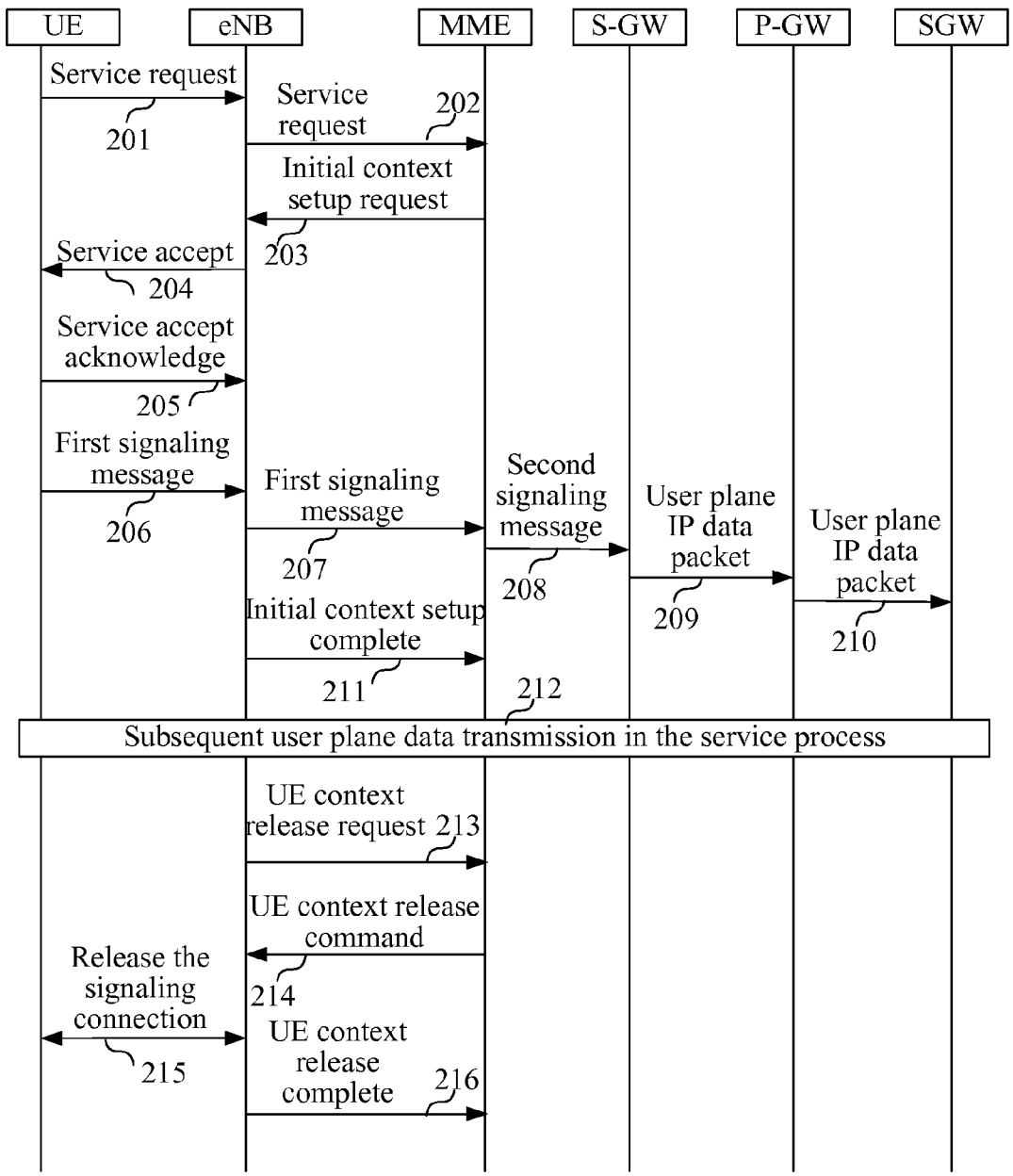
FIG. 2 is a schematic flowchart of a method for transmitting user plane data according to a second embodiment of the present invention.

FIG. 2 is a schematic flowchart of a method for transmitting user plane data according to a second embodiment of the present invention. This embodiment is applicable to a related service process where a UE in an idle state sends a short message service over IP (MO SMS), that is, the UE in the idle state actively initiates a service request to an MME through an eNB, and the UE determines to use a signaling connection mode to send the MO SMS. As shown in FIG. 2, the method for transmitting user plane data according to this embodiment includes the following steps:

Step 201: A UE in an idle state sends a service request message to an eNB, where the service request message carries indication information indicating that only a signaling connection is established instead of a radio interface side user plane bearer, that is, an RAB, between the UE and an S-GW.

Step 202: The eNB receives the service request message, and forwards the service request message to an MME.

Step 203: The MME receives the service request message, and sends an initial context setup request message to the eNB, where the initial context setup request message carries a radio parameter of the UE (for example, a radio capability parameter of the UE) and identification information indicating that the radio interface side user plane bearer, that is, the RAB of the UE does not need to be established.

Step 204: The eNB receives the initial context setup request message, and sends a service accept message to the UE.

Step 205: The UE receives the service accept message, and returns a service accept acknowledge message to the eNB.

Message functions in step 204 and step 205 may be implemented through an existing message process mechanism, for example, radio security mode assignment message process.

By now, the establishment of a signaling connection between the UE and the MME is completed.

Step 206: The UE sends a first signaling message to the eNB, where a user plane IP data packet carrying MO SMS content is encapsulated in the first signaling message.

Step 207: The eNB receives the first signaling message, and forwards the first signaling message to the MME.

It should be noted that, this step and the "forward" steps involved in the following embodiments of the present invention may be interpreted in two ways: one is transparent transfer; the other is to encapsulate a user plane IP data packet in a received signaling message into another new signaling message for retransmission.

Step 208: The MME receives the first signaling message, and sends a second signaling message to the S-GW, where a user plane IP data packet carrying MO SMS content is encapsulated in the second signaling message.

Step 209: The S-GW receives the second signaling message, and sends the user plane IP data packet carrying the MO SMS content to a packet data network gateway (Packet Data Network Gateway, abbreviated as P-GW).

In this step, the S-GW sends the user plane IP data packet to the P-GW through a user plane bearer of the UE between the S-GW and the P-GW. Because the UE may have multiple radio interface side user plane bearers, in order to enable the S-GW to distinguish through which user plane bearer the user plane IP data packet received from the MME should be transmitted, where the user plane bearer is between the S-GW and the P-GW, in addition to the user plane IP data packet carrying MO SMS content, a user plane data stream identification corresponding to the user plane IP data packet may be further encapsulated in the first signaling message and the second signaling message in the foregoing steps, where the user plane data stream identification is used for the network to distinguish which user plane bearer of the UE should be selected to transmit the user plane IP data packet in the network.

In this embodiment, the user plane data stream identification may be an EPS bearer ID (EPS Bearer ID, abbreviated as EBI). The UE may perform flow matching on an uplink user plane IP data packet to be sent by using an uplink traffic flow template (Traffic Flow Template, abbreviated as TFT) maintained by the UE, that is, perform matching on information such as a source IP address of the uplink user plane IP data packet, a destination IP address of the uplink user plane IP data packet, a protocol type of the uplink user plane IP data packet, a source port number of the uplink user plane IP data packet and a destination port number of the uplink user plane IP data packet, to obtain an EBI indicating which user plane bearer of the UE should be selected to transmit the user plane IP data packet, and encapsulate the EBI and the uplink user plane IP data packet carrying the MO SMS content into the first signaling message and send the first signaling message to the MME through the eNB, and the MME encapsulates the EBI and the uplink user plane IP data packet carrying the MO SMS content in the second signaling message and sends the second signaling message to the S-GW. After receiving the second signaling message, the S-GW selects a corresponding user plane bearer according to the EBI in the second signaling message, and sends the uplink user plane IP data packet in the second signaling message to the P-GW through the selected user plane bearer. Further, in this embodiment, the user plane data stream identification may also adopt an EBI of a default bearer of a packet data network connection (PDN Connection) to which the uplink user plane IP data packet belongs.

It should be noted that, when the proxy mobile IPv6 (Proxy Mobile IPv6, abbreviated as PMIPv6) protocol, instead of the GPRS tunneling protocol (GPRS Tunneling Protocol, abbreviated as GTP), is adopted between the S-GW and the P-GW, the granularity of a user plane bearer (that is, a PMIPv6 tunnel) of the UE between the S-GW and the P-GW is coarser than the granularity of a radio interface side user plane bearer (that is, an RAB) between the UE and a network radio side, that is, multiple RABs correspond to one user plane bearer between the S-GW and the P-GW, and the corresponding relationship is fixed, so that when the PMIPv6 protocol is adopted between the S-GW and the P-GW, the S-GW still can select a correct PMIPv6 tunnel through the EBI to transmit the uplink user plane IP data packet to the P-GW.

Step 210: The P-GW receives the user plane IP data packet carrying the MO SMS content, and forwards the user plane IP data packet carrying the MO SMS content to a short message gateway (Short Message Gateway, abbreviated as SMG), so that finally the user plane IP data packet carrying the MO SMS content is sent to a designated receiver.

In this step, the SMG is not necessarily a short message center, and according to different short message solutions, may be a proxy gateway that is used to forward a short message between the UE and a short message center, for example, in a short message solution of an IP multimedia subsystem (IP Multimedia Subsystem, abbreviated as IMS), the SMG may be a proxy call session control function (Proxy Call Session Control Function, abbreviated as P-CSCF). In fact, the SMG may generally refer to a peer network entity communicating with the UE, and includes a network element or another UE. The function of the SMG is not changed in this step.

Step 211: The eNB receives the service accept acknowledge message, and sends an initial context setup complete message to the MME.

It should be noted that, in this embodiment, step 211 is a subsequent step associated with step 205, and because steps 206 to 210 describe that the UE may send an uplink user plane IP data packet through a signaling channel after completing step 205, there is no strict timing constraint relationship between steps 206 to 210 and step 211 in fact.

Step 212: Subsequent user plane data transmission in the service process.

In this step, generally, after receiving the MO SMS in step 210, the SMG returns an acknowledge report to the UE. Specifically, the SMG may send a downlink user plane IP data packet carrying the acknowledge report to the S-GW through the P-GW, the S-GW sends a signaling message in which the downlink user plane IP data packet is encapsulated to the MME, and the MME sends a signaling message in which the downlink user plane IP data packet is encapsulated to the UE through the eNB.

Similarly, not only the downlink user plane IP data packet carrying the acknowledge report is encapsulated in the signaling message sent by the S-GW to the MME and the signaling message sent by the MME to the UE, but a user plane data stream identification corresponding to the downlink user plane IP data packet, for example, an EBI of a user plane bearer, may be further encapsulated in the signaling message sent by the S-GW to the MME and the signaling message sent by the MME to the UE.

When the GTP is adopted between the S-GW and the P-GW, the granularity of a user plane bearer (that is, a GTP tunnel) between the S-GW and the P-GW is consistent with the granularity of a radio interface side user plane bearer (that is, an RAB) between the UE and the network radio side. The S-GW receives the user plane IP data packet from the P-GW through a user plane bearer of the UE, then a user plane data stream identification corresponding to the user plane bearer is encapsulated as a parameter in the signaling message sent to the MME.

When the PMIPv6 protocol is adopted between the S-GW and the P-GW, the S-GW performs, according to a downlink TFT previously generated when a user plane bearer is established, flow matching on the transmitted downlink user plane IP data packet, obtains a user plane data stream identification identifying which user plane bearer of the UE should be selected to transmit the downlink user plane IP data packet, and encapsulates the user plane data stream identification as a parameter in the signaling message sent to the MME.

After receiving the signaling message in which the downlink user plane IP data packet and the user plane data stream identification are encapsulated, the UE may perform processing according to a processing principle in the prior art that the downlink user plane IP data packet is received through a user plane bearer corresponding to the user plane data stream identification, which is not repeatedly described here.

Step 213: After the service process ends, if the eNB monitors that there is no signaling interaction between the UE and the MME for a period of time, the eNB sends a UE context release request message to the MME.

In a conventional manner of transmitting user plane data (user plane IP data packet) through establishing (recovering) a radio interface side user plane bearer of the UE, because the user plane data does not pass through the MME, the MME cannot monitor whether a user plane channel is idle, which needs to be monitored by the eNB, and the eNB instructs the MME to release a control plane channel and the user plane channel after the control plane channel (signaling connection) and the user plane channel (user plane bearer) have been idle for a period of time. In the embodiment of the present invention, when a signaling connection manner is selected to perform services of small data volumes such as a short message service, the radio interface side user plane bearer is not established, and all signaling interactions between the UE and the MME necessarily pass through the MME, so that the MME itself may monitor the idle state of the signaling connection and determine when to release the signaling connection to enable the UE to be in an idle state. Therefore, this step is not mandatory but optional.

Step 214: The MME determines to release the signaling connection between the UE and the MME, and sends a UE context release command message to the eNB.

Step 215: The eNB receives the UE context release command message, interacts with the UE, and releases the signaling connection between the UE and the eNB.

Because in the embodiment of the present invention, the radio interface side user plane bearer (that is, RAB) between the UE and the S-GW is not established (recovered), the eNB does not need to release the radio interface side user plane bearer of the UE in this step, which simplifies the processing of the UE and the eNB and the signaling interaction between the MME and the S-GW, reduces loads of the UE and the eNB, and meanwhile reduces loads of the MME and the S-GW.

Step 216: The eNB returns a UE context release complete message to the MME.

In this embodiment, when the UE in the idle state performs an MO SMS service, no signaling message interaction needs to be performed between the MME and the S-GW to establish (recover) a radio interface side user plane bearer, that is, an RAB, between the UE and the S-GW, and after a signaling connection is established between the UE in the idle state and the MME, and the UE selects the signaling connection mode, an uplink user plane IP data packet carrying MO SMS content is directly sent to the network side through the signaling connection, with no need to specifically recover (establish) a radio interface side user plane bearer, that is, an RAB, between the UE and the network side, that is, the S-GW, which can save radio resources and the signaling overhead, thus reducing the network load and lowering the operating cost of an operator.

Figure 3:
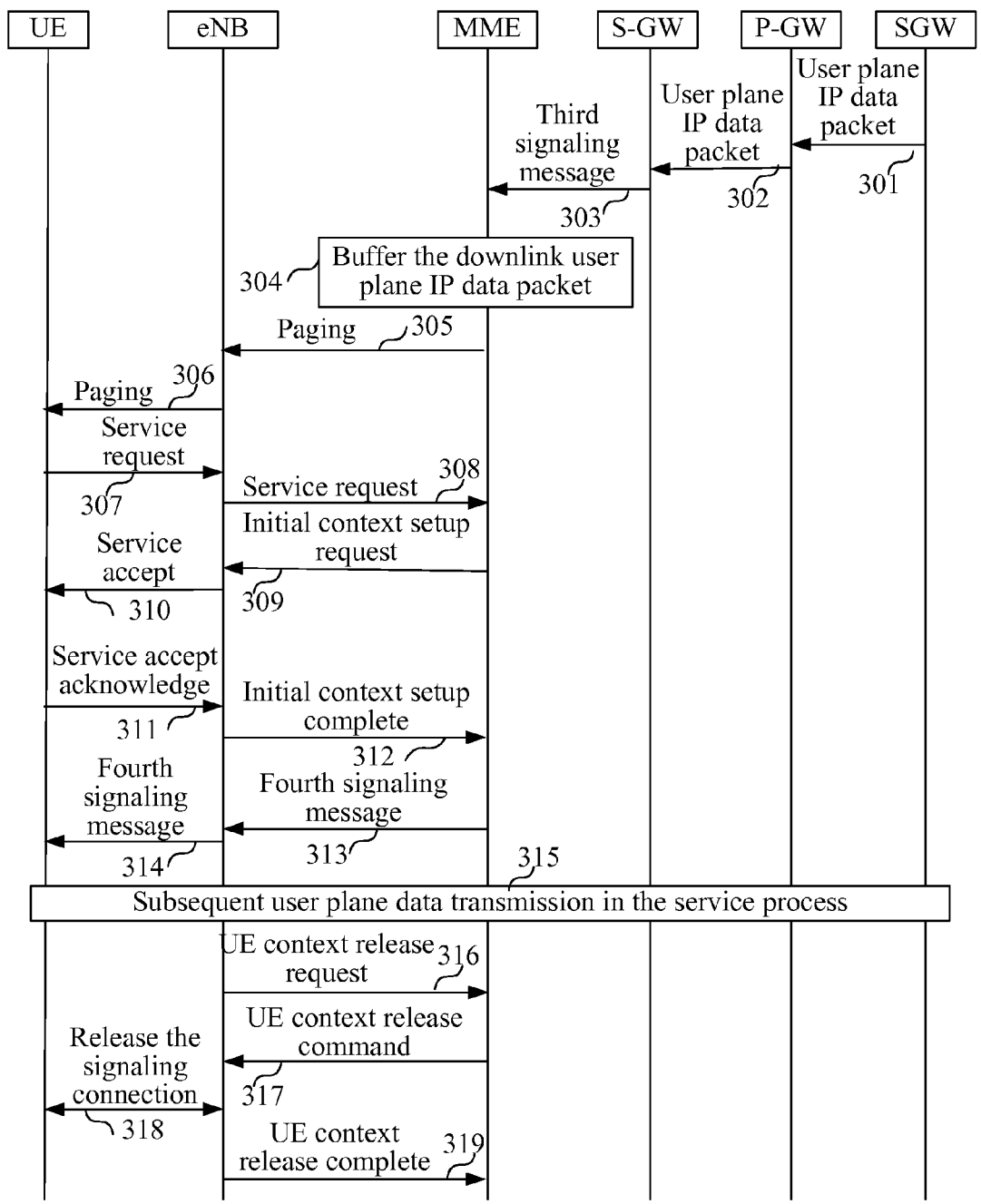
FIG. 3 is a schematic flowchart of a method for transmitting user plane data according to a third embodiment of the present invention.

FIG. 3 is a schematic flowchart of a method for transmitting user plane data according to a third embodiment of the present invention. This embodiment is applicable to a related service process where a UE in an idle state receives a short message service over IP (MT SMS), that is, the UE in the idle state is paged by a network side through an eNB and passively initiates a service request to an MME through the eNB, and an S-GW determines to use a signaling connection mode to send the MT SMS to the UE, where a user plane IP data packet carrying MT SMS content is buffered on the MME. As shown in FIG. 3, the method for transmitting user plane data according to this embodiment includes the following steps:

Step 301: An SMG sends a user plane IP data packet carrying MT SMS content to a P-GW.

In this step, a destination address of the user plane IP data packet is an IP address obtained by a UE in an idle state during a process of establishing a user plane bearer.

Step 302: The P-GW receives the user plane IP data packet carrying the MT SMS content, and forwards the user plane IP data packet carrying the MT SMS content to an S-GW.

Step 303: The S-GW receives the user plane IP data packet carrying the MT SMS content, and after acknowledging that information about a radio interface side user plane bearer, that is, an RAB corresponding to the user plane IP data packet is invalid, sends a third signaling message to an MME, where the user plane IP data packet carrying the MT SMS content is encapsulated in the third signaling message.

In this step, the S-GW finds that the information about the radio interface side user plane bearer, that is, the RAB corresponding to the user plane IP data packet is invalid, and the S-GW may select a signaling connection mode to transmit the user plane IP data packet. Similarly, in this step, not only the user plane IP data packet carrying the MT SMS content is encapsulated in the third signaling message, but a user plane stream identification corresponding to a downlink user plane IP data packet, for example, an EBI of a user plane bearer, may be further encapsulated in the third signaling message.

Step 304: The MME receives the third signaling message, acknowledges that a target UE is in the idle state, and buffers the user plane IP data packet carrying the MT SMS content.

Step 305: The MME sends a paging message to an eNB.

Step 306: The eNB receives the paging message, and broadcasts the paging message within a specified coverage area.

In step 305 and step 306, the MME may page the UE through the eNB within a tracking area (TA) range included in a tracking area list (TA list) allocated for the UE.

By now, the UE in the idle state is triggered to passively initiate a service request to the MME through the eNB.

Step 307: The UE receives the paging message, and sends a service request message to the eNB.

Step 308: The eNB receives the service request message, and forwards the service request message to the MME.

Step 309: The MME receives the service request message, and sends an initial context setup request message to the eNB, where the initial context setup request message carries a radio parameter of the UE (for example, a radio capability parameter of the UE), and meanwhile the MME indicates that the eNB does not need to establish a radio interface side user plane bearer, that is, an RAB of the UE, in a manner of not carrying any RAB context information of the UE in the message or a manner of carrying an explicit indication in the message.

Step 310: The eNB receives the initial context setup request message, and sends a service accept message to the UE.

Step 311: The UE receives the service accept message, and returns a service accept acknowledge message to the eNB.

Message functions in step 310 and step 311 may be implemented through an existing message process mechanism, for example, radio security mode assignment message process.

By now, the establishment of a signaling connection between the UE and the MME is completed.

Step 312: The eNB receives the service accept acknowledge message, and sends an initial context setup complete message to the MME.

Step 313: The MME receives the initial context setup complete message, and sends a fourth signaling message to the eNB, where the buffered user plane IP data packet carrying the MT SMS content is encapsulated in the fourth signaling message.

Similarly, in this step, not only the user plane IP data packet carrying the MT SMS content is encapsulated in the fourth signaling message, but a user plane data stream identification corresponding to the downlink user plane IP data packet, for example, an EBI of a user plane bearer, may be further encapsulated in the fourth signaling message.

Step 314: The eNB receives the fourth signaling message, and forwards the fourth signaling message to the UE.

By now, the UE received the user plane IP data packet carrying the MT SMS content. The UE may perform processing according to the user plane data stream identification carried in the fourth signaling message and in terms of a processing principle in the prior art that the downlink user plane IP data packet is received through a user plane bearer corresponding to the user plane data stream identification, which is not repeatedly described here.

Step 315: Subsequent user plane data transmission in the service process.

In this step, generally, after receiving the MT SMS in step 314, the UE returns an acknowledge report to the SMG. Specifically, the UE may send a signaling message in which an uplink user plane IP data packet carrying the acknowledge report is encapsulated to the MME through the eNB, the MME sends a signaling message in which the uplink user plane IP data packet carrying the acknowledge report is encapsulated to the S-GW, and the S-GW extracts the uplink user plane IP data packet carrying the acknowledge report from the signaling message, and then sends the uplink user plane IP data packet carrying the acknowledge report to the SMG through the P-GW.

Similarly, not only the uplink user plane IP data packet carrying the acknowledge report is encapsulated in the signaling message sent by the UE to the MME and the signaling message sent by the MME to the S-GW, but a user plane data stream identification corresponding to the downlink user plane IP data packet, for example, an EBI of a user plane bearer, may be further encapsulated in the signaling message sent by the UE to the MME and the signaling message sent by the MME to the S-GW.

Step 316: After the service process ends, if the eNB monitors that there is no signaling interaction between the UE and the MME for a period of time, the eNB sends a UE context release request message to the MME.

In a conventional manner of transmitting user plane data through establishing (recovering) a radio interface side user plane bearer of the UE, because the user plane data does not pass through the MME, the MME cannot monitor whether a user plane channel is idle, which needs to be monitored by the eNB, and the eNB instructs the MME to release a control plane channel and the user plane channel after the control plane channel (signaling connection) and the user plane channel (user plane bearer) have been idle for a period of time. In the embodiment of the present invention, when a signaling connection mode is selected to perform services of small data volumes such as a short message service, the radio interface side user plane bearer is not established, and all signaling interaction between the UE and the MME necessarily pass through the MME, so that the MME itself may monitor the idle state of the signaling connection and determine when to release the signaling connection to enable the UE to be in an idle state. Therefore, this step is not mandatory but optional.

Step 317: The MME determines to release the signaling connection between the UE and the MME, and sends a UE context release command message to the eNB.

Step 318: The eNB receives the UE context release command message, interacts with the UE, and releases the signaling connection between the UE and the eNB.

Because in the embodiment of the present invention, the radio interface side user plane bearer (that is, the RAB) between the UE and the S-GW is not established (recovered), the eNB does not need to release the radio interface side user plane bearer of the UE in this step, which simplifies the processing of the UE and the eNB and the signaling interaction between the MME and the S-GW, reduces loads of the UE and the eNB, and meanwhile reduces loads of the MME and the S-GW.

Step 319: The eNB returns a UE context release complete message to the MME.

In this embodiment, when the UE in the idle state performs an MT SMS service, no signaling message interaction needs to be performed between the MME and the S-GW to establish (recover) a radio interface side user plane bearer, that is, an RAB, between the UE and the S-GW, and after selecting a signaling connection mode, the S-GW directly sends a downlink user plane IP data packet carrying MT SMS content to the MME, and the MME buffers the downlink user plane IP data packet, and pages the UE. After a signaling connection is established between the paged UE in the idle state and the MME, the downlink user plane IP data packet carrying the MT SMS content is directly sent to the UE through the signaling connection, with no need to specifically recover (establish) a radio interface side user plane bearer, that is, an RAB, between the UE and the network side, that is, the S-GW, which can save radio resources and the signaling overhead, thus reducing the network load and lowering the operating cost of an operator.

Figure 4:
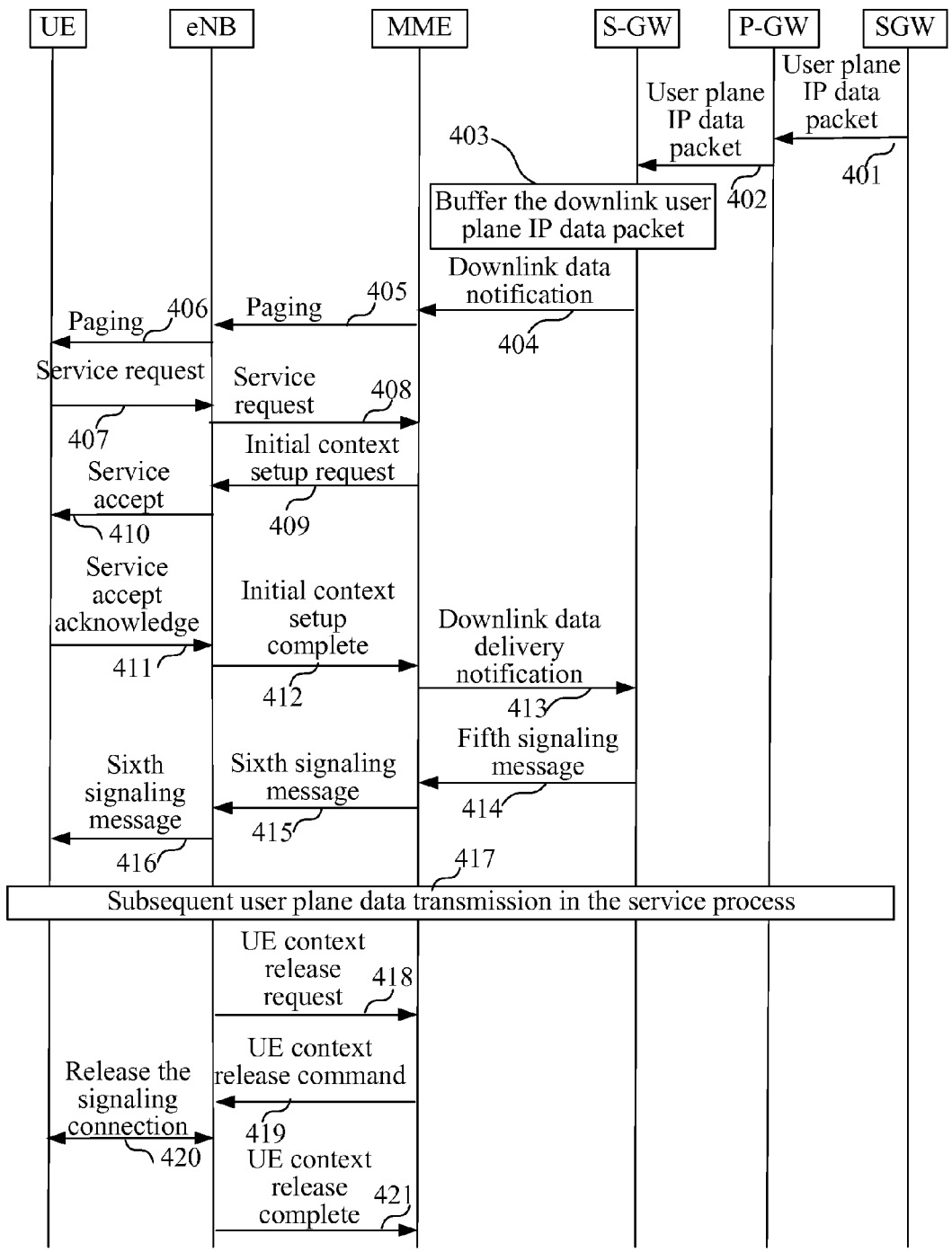
FIG. 4 is a schematic flowchart of a method for transmitting user plane data according to a fourth embodiment of the present invention.

FIG. 4 is a schematic flowchart of a method for transmitting user plane data according to a fourth embodiment of the present invention. This embodiment is applicable to a related service process where a UE in an idle state receives a short message over IP (MT SMS), that is, the UE in the idle state is paged by a network side through an eNB and passively initiates a service request to an MME through the eNB, and an S-GW determines to use a signaling connection mode to send the MT SMS to the UE. Compared with the previous embodiment, in this embodiment, a user plane IP data packet carrying MT SMS content is buffered on the S-GW. As shown in FIG. 4, the method for transmitting user plane data according to this embodiment includes the following steps:

Step 401: An SMG sends a user plane IP data packet carrying MT SMS content to a P-GW.

In this step, a destination address of the user plane IP data packet is an IP address obtained by a UE in an idle state during a process of establishing a user plane bearer.

Step 402: The P-GW receives the user plane IP data packet carrying the MT SMS content, and forwards the user plane IP data packet carrying the MT SMS content to an S-GW.

Step 403: The S-GW receives the user plane IP data packet carrying the MT SMS content, and after acknowledging that information about a radio interface side user plane bearer, that is, an RAB corresponding to the user plane IP data packet is invalid, buffers the user plane IP data packet carrying the MT SMS content.

In this step, the S-GW finds that the information about the radio interface side user plane bearer, that is, the RAB corresponding to the user plane IP data packet is invalid, and the S-GW may select a signaling connection mode to transmit the user plane IP data packet.

Step 404: The S-GW sends a downlink data notification message to an MME, where the downlink data notification message carries indication information indicating that a user plane IP data packet is transmitted through a signaling connection.

Step 405: The MME receives the downlink data notification message, acknowledges that a target UE is in the idle state, and sends a paging message to an eNB.

Step 406: The eNB receives the paging message, and broadcasts the paging message within a specified coverage area.

In step 405 and step 406, the MME may page the UE through the eNB within a tracking area (TA) range included in a tracking area list (TA list) allocated for the UE.

By now, the UE in the idle state is triggered to passively initiate a service request to the MME through the eNB.

Step 407: The UE receives the paging message, and sends a service request message to the eNB.

Step 408: The eNB receives the service request message, and forwards the service request message to the MME.

Step 409: The MME receives the service request message, and sends an initial context setup request message to the eNB, where the initial context setup request message carries a radio parameter of the UE (for example, a radio capability parameter of the UE), and according to the indication message in step 404, the MME indicates that the eNB does not need to establish the radio interface side user plane bearer, that is, the RAB of the UE, in a manner of not carrying any RAB context information of the UE in the message or a manner of carrying an explicit indication in the message.

Step 410: The eNB receives the initial context setup request message, and sends a service accept message to the UE.

Step 411: The UE receives the service accept message, and returns a service accept acknowledge message to the eNB.

Message functions in step 410 and step 411 may be implemented through an existing message process mechanism, for example, radio security mode assigning message process.

By now, the establishment of a signaling connection between the UE and the MME is completed.

Step 412: The eNB receives the service accept acknowledge message, and sends an initial context setup complete message to the MME.

Step 413: The MME receives the initial context setup complete message, and sends a downlink data delivery notification message to the S-GW, to notify that the establishment of a signaling connection between the UE and the S-GW is completed.

Step 414: The S-GW receives the downlink data delivery notification message, and sends a fifth signaling message to the MME, where the buffered user plane IP data packet carrying the MT SMS content is encapsulated in the fifth signaling message.

Similarly, in this step, not only the user plane IP data packet carrying the MT SMS content is encapsulated in the fifth signaling message, but a user plane data stream identification corresponding to the downlink user plane IP data packet, for example, an EBI of a user plane bearer, may be further encapsulated in the fifth signaling message.

Step 415: The MME receives the fifth signaling message, and sends a sixth signaling message to the eNB, where the user plane IP data packet carrying the MT SMS content is encapsulated in the sixth signaling message.

Similarly, in this step, not only the user plane IP data packet carrying the MT SMS content is encapsulated in the sixth signaling message, but a user plane data stream identification corresponding to the downlink user plane IP data packet, for example, an EBI of a user plane bearer, may be further encapsulated in the sixth signaling message.

Step 416: The eNB receives the sixth signaling message, and forwards the sixth signaling message to the UE.

By now, the UE received the user plane IP data packet carrying the MT SMS content. The UE may perform processing according to the user plane data stream identification carried in the sixth signaling message and in terms of a processing principle in the prior art that the downlink user plane IP data packet is received through a user plane bearer corresponding to the user plane data stream identification, which is not repeatedly described here.

Step 417: Subsequent user plane data transmission in the service process.

In this step, generally, after receiving the MT SMS in step 415, the UE returns an acknowledge report to the SMG. Specifically, the UE may send a signaling message in which an uplink user plane IP data packet carrying the acknowledge report is encapsulated to the MME through the eNB, the MME sends a signaling message in which the uplink user plane IP data packet carrying the acknowledge report is encapsulated to the S-GW, and the S-GW extracts the uplink user plane IP data packet carrying the acknowledge report from the signaling message, and then sends the uplink user plane IP data packet carrying the acknowledge report to the SMG through the P-GW.

Similarly, not only the uplink user plane IP data packet carrying the acknowledge report is encapsulated in the signaling message sent by the UE to the MME and the signaling message sent by the MME to the S-GW, but a user plane data stream identification corresponding to the downlink user plane IP data packet, for example, an EBI of a user plane bearer, may be further encapsulated in the signaling message sent by the UE to the MME and the signaling message sent by the MME to the S-GW.

Step 418: After the service process ends, if the eNB monitors that there is no signaling interaction between the UE and the MME for a period of time, the eNB sends a UE context release request message to the MME.

In a conventional manner of transmitting user plane data through establishing (recovering) a radio interface side user plane bearer of the UE, because the user plane data does not pass through the MME, the MME cannot monitor whether a user plane channel is idle, which needs to be monitored by the eNB, and the eNB instructs the MME to release a control plane channel and the user plane channel after the control plane channel (signaling connection) and the user plane channel (user plane bearer) have been idle for a period of time. In the embodiment of the present invention, when a signaling connection mode is selected to perform services of small data volumes such as a short message service, the radio interface side user plane bearer is not established, and all signaling interaction between the UE and the MME necessarily pass through the MME, so that the MME itself may monitor the idle state of the signaling connection and determine when to release the signaling connection to enable the UE to be in an idle state. Therefore, this step is not mandatory but optional.

Step 419: The MME determines to release the signaling connection between the UE and the MME, and sends a UE context release command message to the eNB.

Step 420: The eNB receives the UE context release command message, interacts with the UE, and releases the signaling connection between the UE and the eNB.

Because in the embodiment of the present invention, the radio interface side user plane bearer (that is, the RAB) between the UE and the S-GW is not established (recovered), the eNB does not need to release the radio interface side user plane bearer of the UE in this step, which simplifies the processing of the UE and the eNB and the signaling interaction between the MME and the S-GW, reduces loads of the UE and the eNB, and meanwhile reduces loads of the MME and the S-GW.

Step 421: The eNB returns a UE context release complete message to the MME.

In this embodiment, when the UE in the idle state performs an MT SMS service, no signaling message interaction needs to be performed between the MME and the S-GW to establish (recover) a radio interface side user plane bearer, that is, an RAB, between the UE and the S-GW, and after selecting a signaling connection mode, the S-GW buffers the received downlink user plane IP data packet, and instructs the MME to page the UE. After a signaling connection is established between the paged UE in the idle state and the MME, the S-GW sends the buffered downlink user plane IP data packet carrying the MT SMS content to the MME, and the MME directly sends the downlink user plane IP data packet to the UE through the signaling connection, with no need to specifically recover (establish) a radio interface side user plane bearer, that is, an RAB, between the UE and the network side, that is, the S-GW, which can save radio resources and the signaling overhead, thus reducing the network load and lowering the operating cost of an operator.

In this embodiment, the description is given by taking an example where the S-GW determines a channel mode. In fact, the MME may also make a decision, and in step 405, after the MME receives the downlink data notification message sent by the S-GW, the MME determines a channel mode. If the signaling connection mode is selected, the radio interface side user plane bearer, that is, the RAB does not need to be recovered, and in step 413, the S-GW is instructed to encapsulate the buffered downlink user plane IP data packet carrying the MT SMS content in a signaling message and send the signaling message to the MME.

In order to further reduce the length of the transmitted user plane IP data packet to save radio resources, in the foregoing embodiment of the present invention, when the user plane IP data packet is transmitted through the signaling connection, the UE or the network may perform full compression or IP header compression on the user plane IP data packet encapsulated in the signaling message. Compression is an existing mature technology, and the details are not repeatedly described here.

Further, in the foregoing embodiment of the present invention, when the UE of which the radio interface side user plane bearer, that is, the RAB is in a released state (including the UE of which the signaling connection is also released, and the UE of which only the signaling connection is recovered but the radio interface side user plane bearer is not recovered) needs to send an uplink user plane IP data packet or receive a downlink user plane IP data packet, the UE needs to determine a channel mode, that is, to determine whether to adopt a mode of transmitting user plane data through a signaling connection or adopt a conventional mode of transmitting user plane data through a user plane bearer.

When the UE of which the radio interface side user plane bearer, that is, the RAB is in the released state sends an uplink user plane IP data packet, the UE needs to determine a channel mode. For the UE, the selection operation is relatively easy. Because the UE perceives a type of service, the UE may select a channel mode according to the type of service, adopt the user plane bearer mode for a general service (for example, voice, video, or Web browsing) by default; and adopt the signaling connection mode for a specific service such as SMS over IP.

When the S-GW receives a downlink user plane IP data packet to be sent to the UE of which the radio interface side user plane bearer, that is, the RAB is in the released state, the network side needs to determine a channel mode. In an EPS network, when a solution of buffering at the MME (for example, the third embodiment) is adopted, the channel mode may generally be determined by the S-GW; when a solution of buffering at the S-GW (for example, the fourth embodiment) is adopted, the channel mode may be determined by the S-GW or the MME. Specifically, which channel mode to be adopted may be determined according to a service data flow (Service Data Flow, abbreviated as SDF) attribute parameter of the UE or a bearer attribute parameter of the UE, where the foregoing attribute parameter may include a parameter such as an access point name (Access Point Name, abbreviated as APN) of a service data flow or a bearer, a QoS class identify (Quality of service Class Identify, abbreviated as QCI) of a service data flow or a bearer, a service data flow identification or a bearer identification. For example, when the solution of buffering at the S-GW is adopted, the S-GW may perform the following judgment:

According to a downlink service data flow (Service Data Flow, abbreviated as SDF) filter of the UE saved on the S-GW, a user plane service data flow context of the UE, where the user plane service data flow context of the UE corresponds to the buffered downlink user plane IP data packet, may be found by matching; or according to a downlink traffic flow template (Traffic Flow Template, abbreviated as TFT) of the UE, where the downlink TFT of the UE is saved on the S-GW, a user plane bearer context of the UE, where the user plane bearer context of the UE corresponds to the buffered downlink user plane IP data packet, may be found by matching. The S-GW may further distinguish the type of service according to an attribute parameter recorded by each service data flow context or bearer context, for example, if an SMS service may be identified by a special APN, QCI, service data flow identification or bearer identification, the S-GW may determine the channel mode according to an attribute parameter such as the APN of the service data flow or the bearer, the QCI of the service data flow or the bearer, the service data flow identification or the bearer identification, where the service data flow or the bearer corresponds to the downlink user plane IP data packet.

When the specific service (for example, SMS) cannot be distinguished by adopting the attribute parameter such as the special APN, QCI, service data flow identification or bearer identification, the S-GW needs to distinguish the service data flow at a finer granularity, for example, IP protocol header information of the user plane IP data packet.

For example, when the UE performs another service or the MT SMS service of a service domain of an IP multimedia subsystem (IP Multimedia Subsystem, abbreviated as IMS), a service message is sent from a P-CSCF to the UE. The foregoing service message is encapsulated in a user plane IP data packet and reaches the S-GW through a user plane bearer between the P-GW and the S-GW, and the S-GW needs to distinguish the user plane IP data packet of the MT SMS service so as to determine the channel mode.

The P-CSCF may use different IP protocol header information, for example, IP address, port number, Internet protocol security (Internet Protocol Security, abbreviated as IPSEC) parameter index, type of service (Type of Service, abbreviated as ToS)/differentiated services code point (Differentiated Services Code Point, abbreviated as DSCP), IPv6 flow label (Flow Label), packet length or another parameter, to encapsulate user plane IP data packets of another service and the MT SMS service, so that the S-GW may distinguish whether the MT SMS service or another service is borne according to the IP protocol header information of the received downlink user plane IP data packet. A filtering condition (Filter) for IP protocol header information and a corresponding type of service may be delivered by the P-CSCF to the S-GW through a policy control and charging rules function (Policy Control and Charging Rules Function, abbreviated as PCRF) entity, or may be configured on the S-GW through an operation and maintenance interface. When the S-GW buffers the downlink user plane IP data packet, and the MME determines a channel mode, that is, selects a channel mode, in order to help the MME to select a mode, the S-GW, when sending the downlink data notification message to the MME, may send an attribute parameter such as an APN of the downlink user plane IP data packet, a QCI of the downlink user plane IP data packet, a service data flow identification or a bearer identification, or IP protocol header information (or a header segment of the user plane IP data packet) of the downlink user plane IP data packet to the MME. Correspondingly, the filtering condition (Filter) for IP protocol header information and the corresponding type of service may also be configured on the MME through an operation and maintenance interface.

Optionally, there is another feasible manner: a filtering condition (Filter) for IP protocol header information is configured on the P-GW through a PCRF or operation and maintenance; the P-GW performs, according to the filtering condition, matching on a downlink user plane IP data packet entering the P-GW from the outside to obtain a service data flow to which the downlink user plane IP data packet belongs; the P-GW encapsulates the downlink user plane IP data packet in another user plane IP data packet (by adopting the GTP, PMIPv6 protocol or another encapsulation format) and sends the user plane IP data packet to the S-GW; an outer layer IP header source address of the newly-encapsulated user plane IP data packet is an interface address of the P-GW, and a destination address is an interface address of the S-GW; the P-GW also encapsulates in the user plane IP data packet an indication identification indicating which type of service to which the carried downlink user plane IP data packet belongs, and the used indication identification may be an existing identification in an outer layer IP encapsulation such as TOS/DSCP, IPv6 flow identification or special GTP extension header (GTP extension header), or even may be self-defined private extension information. After receiving the downlink user plane IP data packet from the P-GW, the S-GW may obtain, from the indication identification included in the downlink user plane IP data packet, the type of service, where the type of service corresponds to the service downlink user plane IP data packet in the downlink user plane IP data packet, so as to perform a channel mode selection. A protocol stack of the GTP or PMIPv6 protocol encapsulation adopted between the P-GW and the S-GW is as shown below:

| Service downlink IP data packet |
| GTP-U/PMIPv6 encapsulation |
| Outer layer IP encapsulation |

The S-GW, the MME and the P-GW may judge the type of service according to a combination of the foregoing attribute parameters, for example, for a downlink user plane IP data packet belonging to one/some APN(s) or QCI(s), whether the downlink user plane IP data packet belongs to the specific service needs to be determined through matching according to a filtering condition of IP protocol header information.

It should be noted that, the type of service is not the only parameter for the UE or the network side to determine the channel mode, and the network side (MME/S-GW) may use a more intelligent method to determine the channel mode, so as to perform the channel mode selection.

For example, for the SMS service, the signaling connection mode may be selected at the beginning. If the UE or the network side collects statistics and finds that transmission of user plane data through a signaling connection is too frequent after the signaling connection is established, and considers that it is more efficient if the mode is switched to the conventional mode of transmitting user plane data through a user plane bearer, the UE or the network side may request to recover the user plane bearer, and switch subsequent user plane data to the user plane bearer for transmission; while for another non-SMS service, the signaling connection may also be used to transmit user plane data, for example, for the setup of a voice over Internet Protocol (Voice over Internet Protocol, abbreviated as VoIP) call of an IMS. During the call setup process, because the number of session initiation protocol (Session Initiation Protocol, abbreviated as SIP) signaling interaction and the volume of data are small at an initial stage, the UE or the network side may select to adopt the signaling connection to transmit user plane SIP signaling at the initial stage of call setup, and once the UE or the P-CSCF requests to establish a dedicated bearer for bearing VoIP voice data, the UE or the network side judges that the signaling connection is not suitable for bearing a large volume of user plane data such as VoIP voice data, or the UE or the network side judges that the quality of service (Quality of Service, abbreviated as QoS) of the signaling connection cannot guarantee quality of service requirements of the service, the UE or the network side then determines to establish/recover a radio interface side user plane bearer of the UE, so as to switch user plane data to the user plane bearer for transmission.

Therefore, the method for transmitting user plane data provided in this embodiment is not only applicable to services that have a small volume of service data each time or have no special requirements on the QoS of transmission channels of the service data, and that are frequently performed, for example, SMS service, and instant messaging (IM) service; but is also applicable to some stages, for example, a service establishment stage, of services that have a large volume of service data each time or have special requirements on the QoS of transmission channels of the service data, where the UE or the network side selects whether to execute the method, for example, voice service, video service, or Web browsing service. Therefore, the "user plane IP data packet" transmitted in the embodiment of the present invention should be interpreted in a broader way as long as it falls within the scope of the spirit of the present invention.

It should be noted that, in this embodiment, some UEs may not support the signaling connection mode, or the network side may not support the signaling connection mode although the UEs support the signaling connection mode. In this case, the UEs and the network side need to determine in advance through negotiation whether to support the signaling connection mode of transmitting a user plane IP data packet through a signaling connection for a certain service. Specifically, the negotiation may be implemented through an attach process or a tracking area update (Tracking Area Update, abbreviated as TAU) process, and specifically the following method may be adopted:

The UE sends an attach request message or a TAU request message to the MME through the eNB, where the request message carries capability information of the UE, the capability information may include indication information indicating that the UE supports transmission of a certain service (for example, SMS) through a signaling connection, and if the indication information is not included, it may indicate that the UE does not support transmission of the service through a signaling connection. After the MME receives the attach request message or TAU request message, if the MME does not support the signaling connection mode, the MME may fail to identify the indication information indicating that the UE supports transmission of the service through a signaling connection, and directly ignore the indication information; if the MME supports the signaling connection mode and a network configured on the MME (that is, a connected S-GW) also supports the signaling connection mode, the MME may determine according to the configuration whether a corresponding service supports transmission through a signaling connection.

If an attach process or a TAU process is accompanied with S-GW handover, the MME needs to send a create bearer request message to the S-GW to create a user plane bearer of the UE, and if the UE supports transmission of the service through a signaling connection, the create bearer request message may carry indication information for instructing the S-GW to support the signaling connection mode, that is, transmission through a signaling connection for the corresponding service of the UE.

If a TAU process is accompanied with MME handover but with the S-GW remaining unchanged (the MME at this time is a new side MME), the MME needs to send an update bearer request message to the S-GW, and if the UE supports transmission of the service through a signaling connection, the update bearer request message may carry indication information for instructing the S-GW to support the signaling connection mode, that is, transmission through a signaling connection for the corresponding service of the UE.

After receiving the create bearer request message or the update bearer request message, the S-GW determines to adopt the signaling connection mode, and returns a create bearer response message or an update bearer response message to the MME. Then, the MME returns an attach accept message or a TAU accept message to the UE through the eNB, where the accept message may carry indication information notifying that the S-GW has determined to support the signaling connection mode, that is, transmission through a signaling connection for the corresponding service of the UE.

After the negotiation between the UE and the network side (MME, S-GW) is completed, the UE, the MME, and the S-GW may further determine a channel mode respectively according to the result of negotiation.

The second embodiment of the present invention, the third embodiment of the present invention and the fourth embodiment of the present invention describe the technical solutions according to the embodiments of the present invention in detail by taking an EPS network as an example. In the EPS network, the control plane of the network side and the user plane of the network side are separated, and the MME is a pure control plane entity, so that the signaling connection and the user plane bearer that are at a radio interface side are respectively connected to two network entities, that is, the MME and the S-GW. However, in some networks, for example, GPRS network, WiMax network, or CDMA network, the network side does not adopt the architecture that the control plane and the user plane are completely separated.

For example, in the GPRS network, when a direct tunnel (Direct Tunnel) solution is not adopted, the signaling connection and the user plane bearer that are at the radio interface side of the UE are both connected to an SGSN through a radio access network, that is, a universal mobile telecommunication system territorial radio access network (Universal Mobile Telecommunication System Territorial Radio Access Network, abbreviated as UTRAN) or a global system for mobile communications (Global System for Mobile Communications, abbreviated as GSM)/enhanced data rate for GSM evolution (Enhanced Data rate for GSM Evolution, abbreviated as EDGE) radio access network (GSM EDGE Radio Access Network, abbreviated as GERAN), and the function of the SGSN may be considered as the aggregation of functions of two network entities, that is, the MME and the S-GW, in the EPS network. Inside the SGSN, a control plane module and a user plane module are respectively used to process messages of the control plane and the user plane, and the control plane module and the user plane module inside the SGSN also have an internal message interaction that is used to maintain the user plane bearer (create, modify, or delete) through a signaling interaction between the control plane and another network entity. Therefore, the beneficial effect of reducing the signaling interaction between the MME and the S-GW caused by the fact that there is no need to specifically recover (establish) a radio interface side user plane bearer, that is, an RAB, between the UE and the network side, that is, the S-GW, after the solution of the present invention is applied in the EPS network is still achieved in the GPRS network, except that the reduced signaling interaction is inside the SGSN.

In the GPRS network, when the direct tunnel solution is adopted, the signaling connection at the radio interface side of the UE is connected to an SGSN through a radio access network, that is, a UTRAN or GERAN, and the user plane bearer bypasses the SGSN through a radio access network, that is, a UTRAN or GERAN, and is directly connected to a GGSN (or S-GW). When the UE recovers (establishes) the radio interface side user plane bearer, the SGSN needs to perform signaling interaction with the GGSN to change downlink tunnel information of the user plane bearer on the GGSN (or the S-GW). The application of the solution of the present invention in such a network architecture may save the signaling interaction between the SGSN and the GGSN (or S-GW), and achieves an effect similar to that in the EPS.

It should be noted that, the foregoing method embodiments are expressed as a series of operation combinations for ease of description; however, it should be known to persons skilled in the art that the present invention is not limited to the described sequence of the operations, because some steps may be performed in other sequences or concurrently according to the present invention. Furthermore, it should also be known to persons skilled in the art that all the embodiments described in the specification are exemplary embodiments, and the involved operations and modules may not be necessary for the present invention.

In the foregoing embodiments, the descriptions of the embodiments place different emphasis on different content, and for a part that is not detailed in an embodiment, reference may be made to the relevant descriptions of other embodiments.

Figure 5:
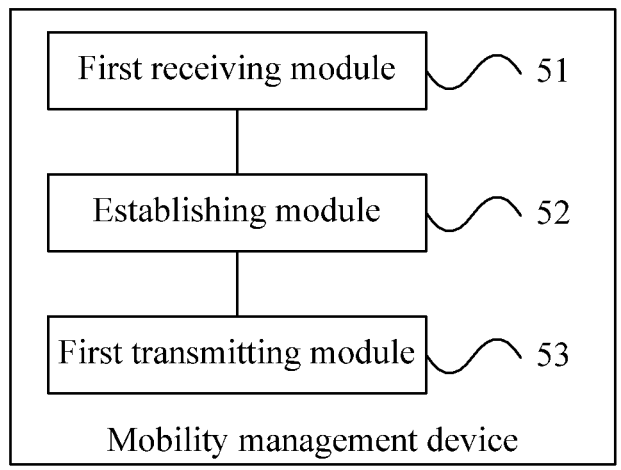
FIG. 5 is a schematic structural diagram of a mobility management device according to a fifth embodiment of the present invention.

FIG. 5 is a schematic structural diagram of a mobility management device according to a fifth embodiment of the present invention. As shown in FIG. 5, the mobility management device according to this embodiment includes a first receiving module 51, an establishing module 52 and a first transmitting module 53. The first receiving module 51 receives a connection establishment request message sent by a UE, the establishing module 52 establishes a signaling connection with the UE according to the connection establishment request message received by the first receiving module 51, and the first transmitting module 53 transmits a user plane IP data packet through the signaling connection established by the establishing module 52.

The method in the first embodiment of the present invention, and the functions of the MME in the second embodiment of the present invention, the MME in the third embodiment of the present invention and the MME in the fourth embodiment of the present invention may all be implemented by the mobility management device provided in this embodiment.

In this embodiment, the connection establishment request message received by the first receiving module 51 may be triggered by the UE in an idle state actively, that is, the UE actively sends a connection establishment request message to a mobility management device through an access network device, and at this time, it indicates that the UE in the idle state needs to actively send an uplink user plane IP data packet, and establishes a radio interface side signaling connection through actively initiating a connection establishment request by the UE; or may be triggered by the UE in the idle state passively according to paging of the network side, that is, after receiving a downlink data notification message or downlink user plane IP data packet, where the downlink data notification message or downlink user plane IP data packet is sent by an access gateway, a mobility management device pages a corresponding UE through an access network device, and triggers the UE to passively send a connection establishment request message to the mobility management device through the access network device, and at this time, it indicates that the network side receives the downlink user plane IP data packet sent to the UE in the idle state, and establishes a radio interface side signaling connection through paging the UE by the network side to passively initiate a connection establishment request.

In this embodiment, after the establishing module establishes a signaling connection between the UE in the idle state and the network side, that is, the mobility management device, the first transmitting module may directly transmit an uplink user plane IP data packet or a downlink user plane IP data packet, where the uplink user plane IP data packet or the downlink user plane IP data packet carries service content, between the UE and the network side through the signaling connection, with no need to specifically establish (recover) a radio interface side user plane bearer, that is, an RAB, between the UE and the network side, that is, an S-GW, which can save the signaling overhead, thus reducing the network load and lowering the operating cost of an operator.

In this embodiment, the access network device may be a network element such as an eNB, an RNC, or a BSC; the mobility management device may be a network element such as an MME, an SGSN, or an ASN-GW; and the access gateway may be a network element such as an S-GW, a GGSN, or an ASN-GW.

It should be noted that, with the evolution of network architecture in future, the network entities may be integrated or divided. For example, the possibility of integrating the mobility management device in the access network device in future is not excluded.

Further, the connection establishment request message received by the first receiving module 51 may include indication information indicating that only a signaling connection is established instead of a radio interface side user plane bearer, and the first transmitting module 53 may be specifically configured to transmit through the signaling connection the uplink user plane IP data packet sent by the UE, with no need to specifically recover (establish) a radio interface side user plane bearer, that is, an RAB, between the UE and the network side, that is, the access gateway, which can save radio resources and the signaling overhead, thus reducing the network load and lowering the operating cost of the operator.

Figure 6:
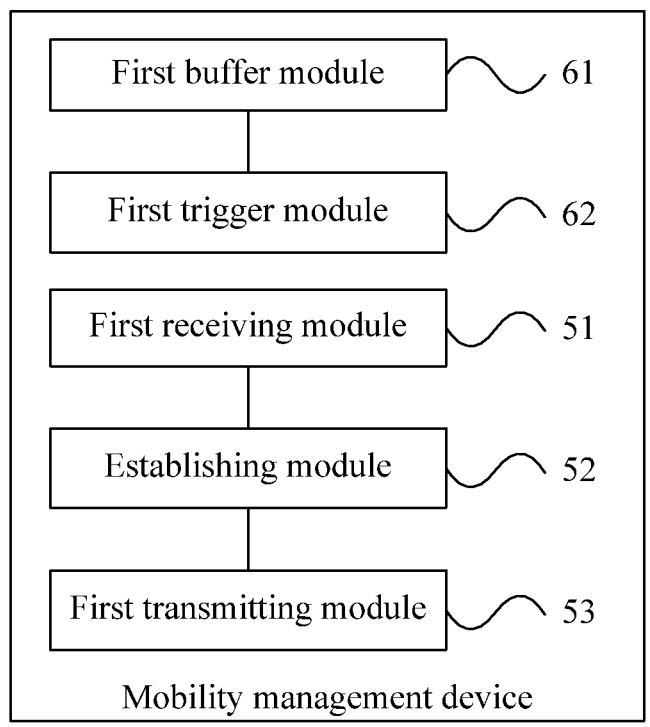
FIG. 6 is a schematic structural diagram of a mobility management device according to a sixth embodiment of the present invention.

FIG. 6 is a schematic structural diagram of a mobility management device according to a sixth embodiment of the present invention. As shown in FIG. 6, compared with the fifth embodiment of the present invention, the mobility management device according to this embodiment may further include a first buffer module 61 and a first trigger module 62. The first buffer module 61 buffers a received user plane IP data packet sent by an access gateway, and the first trigger module 62 pages a UE according to the user plane IP data packet buffered by the first buffer module 61 to trigger the UE to send a connection establishment request message; the first transmitting module 53 may be specifically configured to, according to the user plane IP data packet buffered by the first buffer module 61, transmit the user plane IP data packet through the signaling connection established by the establishing module 52.

In this embodiment, when the UE in an idle state performs an MT SMS service, no signaling message interaction needs to be performed between the mobility management device the access gateway to establish (recover) a radio interface side user plane bearer, that is, an RAB, between the UE and the access gateway, and after selecting a signaling connection mode, the access gateway directly sends a downlink user plane IP data packet carrying MT SMS content to the first buffer module, the first buffer module buffers the downlink user plane IP data packet, and the first trigger module pages the UE. After the establishing module establishes a signaling connection between the paged UE in the idle state and the mobility management device, the first transmitting module may directly send the downlink user plane IP data packet carrying the MT SMS content to the UE through the signaling connection, with no need to specifically recover (establish) a radio interface side user plane bearer, that is, an RAB, between the UE and the network side, that is, the access gateway, which can save radio resources and the signaling overhead, thus reducing the network load and lowering the operating cost of an operator.

Figure 7:
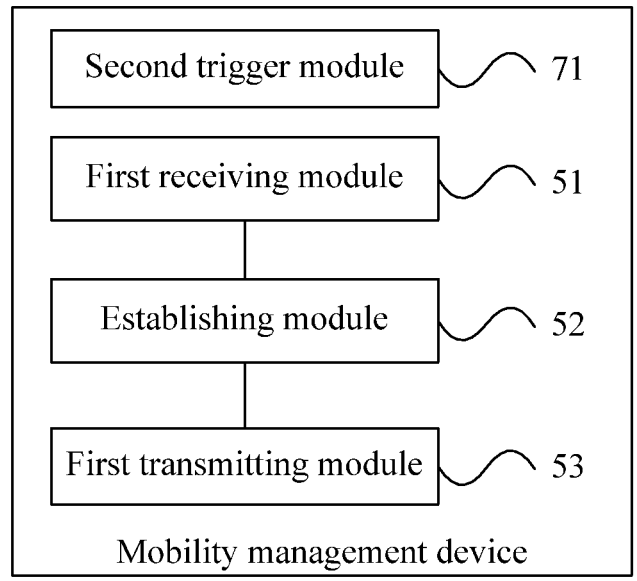
FIG. 7 is a schematic structural diagram of a mobility management device according to a seventh embodiment of the present invention.

FIG. 7 is a schematic structural diagram of a mobility management device according to a seventh embodiment of the present invention. As shown in FIG. 7, compared with the fifth embodiment of the present invention, the mobility management device according to this embodiment may further include a second trigger module 71, configured to page a UE according to a received downlink data notification message sent by an access gateway to trigger the UE to send the connection establishment request message, where the downlink data notification message includes indication information indicating that a user plane IP data packet is transmitted through a signaling connection; the first transmitting module 53 may be specifically configured to transmit, according to the indication information in the downlink data notification message and through the signaling connection established by the establishing module 52, a received user plane IP data packet sent by the access gateway.

In this embodiment, when the UE in the idle state performs an MT SMS service, no signaling message interaction needs to be performed between the mobility management device and the access gateway to establish (recover) a radio interface side user plane bearer, that is, an RAB, between the UE and the access gateway, and after selecting a signaling connection mode, the access gateway buffers the received downlink user plane IP data packet, and instructs the second trigger module to page the UE and notifies that a user plane IP data packet is transmitted through a signaling connection. After the establishing module establishes a signaling connection between the paged UE in the idle state and the mobility management device, the access gateway sends the buffered downlink user plane IP data packet carrying the MT SMS content to the first transmitting module, and the first transmitting module directly sends the downlink user plane IP data packet to the UE through the signaling connection, with no need to specifically recover (establish) a radio interface side user plane bearer, that is, an RAB, between the UE and the network side, that is, the access gateway, which can save radio resources and the signaling overhead, thus reducing the network load and lowering the operating cost of an operator.

Figure 8:
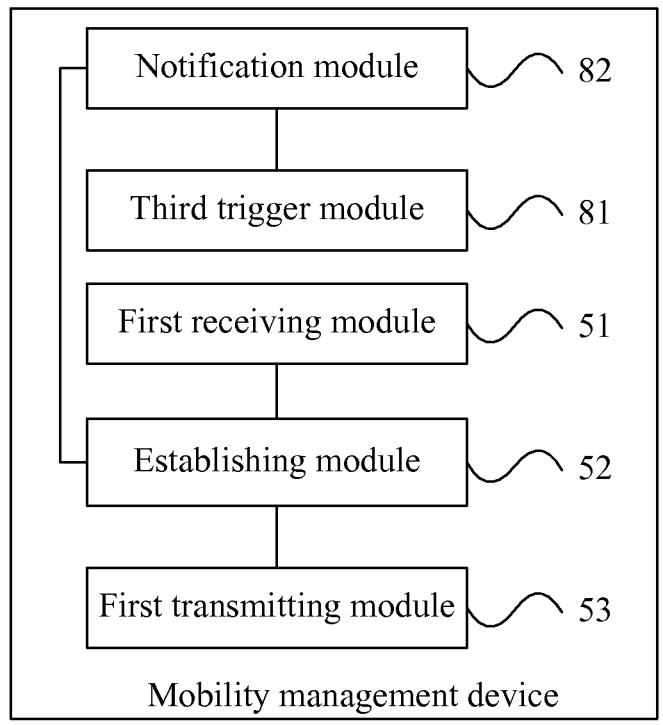
FIG. 8 is a schematic structural diagram of a mobility management device according to an eighth embodiment of the present invention.

FIG. 8 is a schematic structural diagram of a mobility management device according to an eighth embodiment of the present invention. As shown in FIG. 8, compared with the fifth embodiment of the present invention, the mobility management device according to this embodiment may further include a third trigger module 81 and a notification module 82. The third trigger module 81 pages a UE according to a received downlink data notification message sent by an access gateway to trigger the UE to send a connection establishment request message, and after the establishing module 52 establishes a signaling connection with the UE, the notification module 82 sends a downlink data delivery notification message to the access gateway, where the downlink data delivery notification message carries indication information indicating that a user plane IP data packet is transmitted through a signaling connection; the first transmitting module 53 may be specifically configured to transmit, through the signaling connection established by the establishing module 52, a received user plane IP data packet sent by the access gateway.

In this embodiment, when the UE in the idle state performs an MT SMS service, no signaling message interaction needs to be performed between the mobility management device and the access gateway to establish (recover) a radio interface side user plane bearer, that is, an RAB, between the UE and the access gateway, and the access gateway buffers the received downlink user plane IP data packet, and instructs the second trigger module to page the UE. After the mobility management device selects a signaling connection mode, and after the establishing module establishes a signaling connection between the paged UE in the idle state and the mobility management device, the access gateway is instructed to send the downlink user plane IP data packet to the first transmitting module, so that the first transmitting module directly sends the downlink user plane IP data packet to the UE through the signaling connection, with no need to specifically recover (establish) a radio interface side user plane bearer, that is, an RAB, between the UE and the network side, that is, the access gateway, which can save radio resources and the signaling overhead, thus reducing the network load and lowering the operating cost of an operator.

Figure 9:
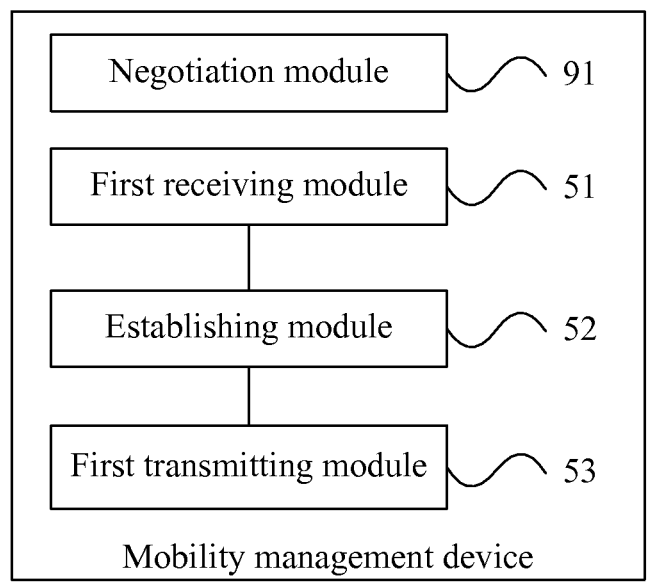
FIG. 9 is a schematic structural diagram of a mobility management device according to a ninth embodiment of the present invention.

FIG. 9 is a schematic structural diagram of a mobility management device according to a ninth embodiment of the present invention. As shown in FIG. 9, compared with the fifth embodiment of the present invention, the mobility management device according to this embodiment may further include a negotiation module 91, configured to negotiate with a UE about whether to support a signaling connection mode, that is, transmitting a user plane IP data packet through a signaling connection, through an attach process or a tracking area update process.

In this embodiment, if some UEs do not support the signaling connection mode, or a network side does not support the signaling connection mode although the UE supports the signaling connection mode, the negotiation module may negotiate with the UE in advance to determine whether to support the signaling connection mode of transmitting a user plane IP data packet through a signaling connection for a certain service, where specifically, the negotiation may be implemented through an attach process or a TAU process. If it is determined to support the signaling connection mode of transmitting a user plane IP data packet through a signaling connection for a certain service, the UE or the network side may select a signaling connection mode respectively for the service in subsequent processes; if it is determined not to support the signaling connection mode of transmitting a user plane IP data packet through a signaling connection for a certain service, the UE or the network side can only select a conventional user plane bearer mode of transmitting user plane data through a user plane bearer for the service in subsequent processes.

Figure 10:
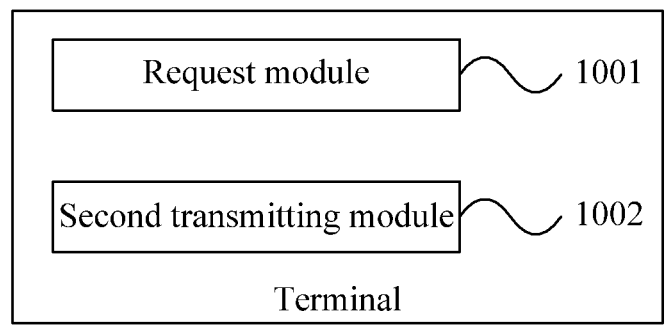
FIG. 10 is a schematic structural diagram of a UE according to a tenth embodiment of the present invention.

FIG. 10 is a schematic structural diagram of a UE according to a tenth embodiment of the present invention. As shown in FIG. 10, the UE according to this embodiment may include a request module 1001 and a second transmitting module 1002. The request module 1001 sends a connection establishment request message to a mobility management device, so that the mobility management device establishes a signaling connection with a UE, and the second transmitting module 1002 transmits a user plane IP data packet through the signaling connection.

In this embodiment, the connection establishment request message sent by the request module 1001 may be triggered by the UE in an idle state actively, that is, the UE actively sends a connection establishment request message to a mobility management device through an access network device, and at this time, it indicates that the UE in the idle state needs to actively send an uplink user plane IP data packet, and establishes a radio interface side signaling connection through actively initiating a connection establishment request by the UE; or may be triggered by the UE in the idle state passively according to paging of a network side, that is, after receiving a downlink data notification message or downlink user plane IP data packet, where the downlink data notification message or downlink user plane IP data packet is sent by an access gateway, a mobility management device pages a corresponding UE through an access network device, and triggers the UE to passively send a connection establishment request message to the mobility management device through the access network device, and at this time, it indicates that the network side receives the downlink user plane IP data packet sent to the UE in the idle state, and establishes a radio interface side signaling connection through paging the UE by the network side to passively initiate a connection establishment request.

In this embodiment, after the mobility management device establishes a signaling connection between the UE in the idle state and the network side, that is, the mobility management device, the second transmitting module may directly send an uplink user plane IP data packet carrying service content or receive a downlink user plane IP data packet carrying service content through the signaling connection, with no need to specifically establish (recover) a radio interface side user plane bearer, that is, an RAB, between the UE and the network side, that is, an S-GW, which can save the signaling overhead, thus reducing the network load and lowering the operating cost of an operator.

Figure 11:
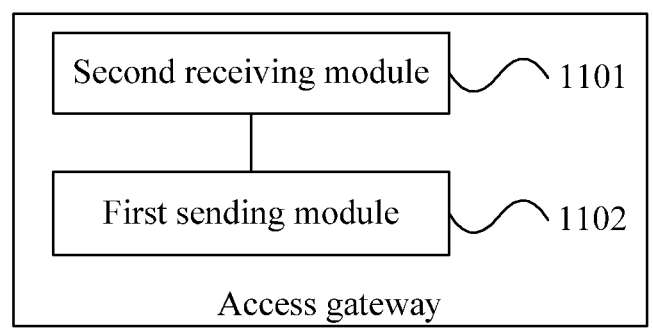
FIG. 11 is a schematic structural diagram of an access gateway according to an eleventh embodiment of the present invention.

FIG. 11 is a schematic structural diagram of an access gateway according to an eleventh embodiment of the present invention. As shown in FIG. 11, the access gateway according to this embodiment may include a second receiving module 1101 and a first sending module 1102. The second receiving module 1101 receives a user plane IP data packet, and the first sending module 1102 sends the user plane IP data packet received by the second receiving module 1101 to a mobility management device, so that the mobility management device establishes a signaling connection with a UE and transmits the user plane IP data packet through the signaling connection.

In this embodiment, when the UE in an idle state performs an MT SMS service, no signaling message interaction needs to be performed between the mobility management device and the access gateway to establish (recover) a radio interface side user plane bearer, that is, an RAB, between the UE and the access gateway, and after the access gateway selects a signaling connection mode, the first sending module directly sends a downlink user plane IP data packet carrying MT SMS content, where the downlink user plane IP data packet carrying MT SMS content is received by the second receiving module, to the mobility management device, and the mobility management device buffers the downlink user plane IP data packet, and pages the UE. After the mobility management device establishes a signaling connection between the paged UE in the idle state and the mobility management device, the mobility management device may directly send the downlink user plane IP data packet carrying the MT SMS content to the UE through the signaling connection, with no need to specifically recover (establish) a radio interface side user plane bearer, that is, an RAB, between the UE and the network side, that is, the access gateway, which can save radio resources and the signaling overhead, thus reducing the network load and lowering the operating cost of an operator.

Figure 12:
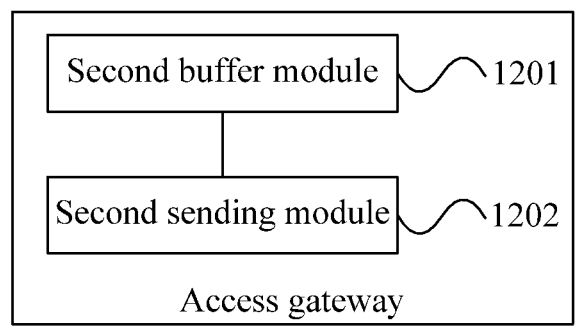
FIG. 12 is a schematic structural diagram of another access gateway according to a twelfth embodiment of the present invention.

FIG. 12 is a schematic structural diagram of another access gateway according to a twelfth embodiment of the present invention. As shown in FIG. 12, the access gateway according to this embodiment may include a second buffer module 1201 and a second sending module 1202. The second buffer module 1201 buffer a received user plane IP data packet, and the second sending module 1202 sends a downlink data notification message to a mobility management device, where the downlink data notification message carries indication information indicating that a downlink IP data packet is transmitted through a signaling connection, so as to page a UE and trigger the UE to send a connection establishment request message; and sends the user plane IP data packet to the mobility management device after the mobility management device establishes a signaling connection with the UE according to the connection establishment request message, so that the mobility management device transmits the user plane IP data packet through the signaling connection.

In this embodiment, when the UE in an idle state performs an MT SMS service, no signaling message interaction needs to be performed between the mobility management device and the access gateway to establish (recover) a radio interface side user plane bearer, that is, an RAB, between the UE and the access gateway, and after the access gateway selects a signaling connection mode, the second buffer module buffers the received downlink user plane IP data packet, and the second sending module instructs the mobility management device to page the UE and instructs the mobility management device to transmit a user plane IP data packet through a signaling connection. After the mobility management device establishes a signaling connection between the paged UE in the idle state and the mobility management device, the second sending module sends the downlink user plane IP data packet carrying the MT SMS content, where the downlink user plane IP data packet carrying the MT SMS content is buffered by the second buffer module, to the mobility management device, and the mobility management device directly sends the downlink user plane IP data packet to the UE through the signaling connection, with no need to specifically recover (establish) a radio interface side user plane bearer, that is, an RAB, between the UE and the network side, that is, the access gateway, which can save radio resources and the signaling overhead, thus reducing the network load and lowering the operating cost of an operator.

Figure 13:
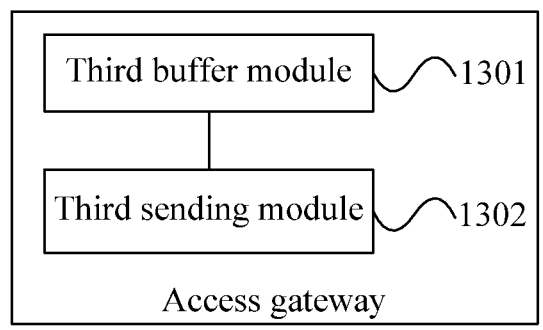
FIG. 13 is a schematic structural diagram of another access gateway according to a thirteenth embodiment of the present invention.

FIG. 13 is a schematic structural diagram of another access gateway according to a thirteenth embodiment of the present invention. As shown in FIG. 13, the access gateway according to this embodiment may include a third buffer module 1301 and a third sending module 1302. The third buffer module 1301 buffers a received user plane IP data packet, and the third sending module 1302 sends a downlink data notification message to a mobility management device, so as to page a UE and trigger the UE to send a connection establishment request message; and sends the user plane IP data packet to the mobility management device according to a received downlink data delivery notification message sent by the mobility management device after the mobility management device establishes a signaling connection with the UE according to the connection establishment request message, where the downlink data delivery notification message carries indication information indicating that a user plane IP data packet is transmitted through a signaling connection, so that the mobility management device transmits the user plane IP data packet through the signaling connection.

In this embodiment, when the UE in an idle state performs an MT SMS service, no signaling message interaction needs to be performed between the mobility management device and the access gateway to establish (recover) a radio interface side user plane bearer, that is, an RAB, between the UE and the access gateway, the third buffer module buffers the received downlink user plane IP data packet, and the third sending module instructs the mobility management device to page the UE. After the mobility management device selects a signaling connection mode, and after the mobility management device establishes a signaling connection between the paged UE in the idle state and the mobility management device, the third sending module is instructed to send the downlink user plane IP data packet to the mobility management device, so that the mobility management device directly sends the downlink user plane IP data packet to the UE through the signaling connection, with no need to specifically recover (establish) a radio interface side user plane bearer, that is, an RAB, between the UE and the network side, that is, the access gateway, which can save radio resources and the signaling overhead, thus reducing the network load and lowering the operating cost of an operator.

Figure 14:
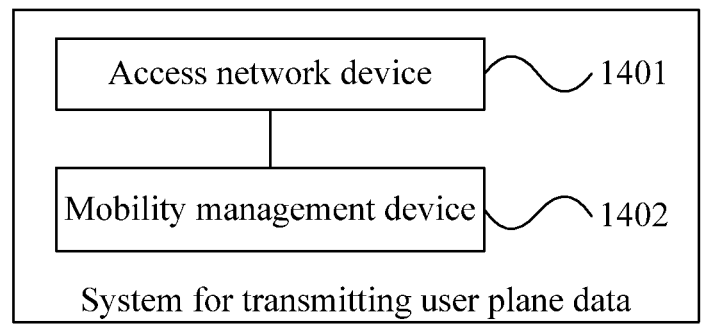
FIG. 14 is a schematic structural diagram of a system for transmitting user plane data according to a fourteenth embodiment of the present invention.

FIG. 14 is a schematic structural diagram of a system for transmitting user plane data according to a fourteenth embodiment of the present invention. As shown in FIG. 14, the system for transmitting user plane data according to this embodiment may include an access network device 1401 and a mobility management device 1402.

The access network device 1401 is configured to receive a connection establishment request message sent by a UE, and send the connection establishment request message.

The mobility management device 1402 is configured to receive the connection establishment request message sent by the access network device 1401, establish a signaling connection with the UE according to the connection establishment request message, and transmit an IP data packet through the signaling connection.

The method in the first embodiment of the present invention, and the functions of the MME in the second embodiment of the present invention, the MME in the third embodiment of the present invention and the MME in the fourth embodiment of the present invention may all be implemented by the mobility management device 1402 in the system for transmitting user plane data provided in this embodiment. The mobility management device 1402 may be the mobility management device provided in the fifth embodiment of the present invention, the sixth embodiment of the present invention, the seventh embodiment of the present invention, the eighth embodiment of the present invention or the ninth embodiment of the present invention.

In this embodiment, after the mobility management device establishes a signaling connection between the UE in the idle state and the network side, that is, the mobility management device, the mobility management device may directly transmit an uplink user plane IP data packet or a downlink user plane IP data packet, where the uplink user plane IP data packet or the downlink user plane IP data packet carries service content, between the UE and the network side through the signaling connection, with no need to specifically establish (recover) a radio interface side user plane bearer, that is, an RAB, between the UE and the network side, that is, an S-GW, which can save the signaling overhead, thus reducing the network load and lowering the operating cost of an operator.

Further, the connection establishment request message received by the mobility management device 1402 may include indication information indicating that only a signaling connection is established instead of a radio interface side user plane bearer, and the mobility management device 1402 may be specifically configured to receive the connection establishment request message sent by the access network device 1401, establish a signaling connection with the UE according to the connection establishment request message, and transmit through the signaling connection an uplink user plane IP data packet sent by the UE, with no need to specifically recover (establish) a radio interface side user plane bearer, that is, an RAB, between the UE and the network side, that is, the access gateway, which can save radio resources and the signaling overhead, thus reducing the network load and lowering the operating cost of the operator.

Figure 15:
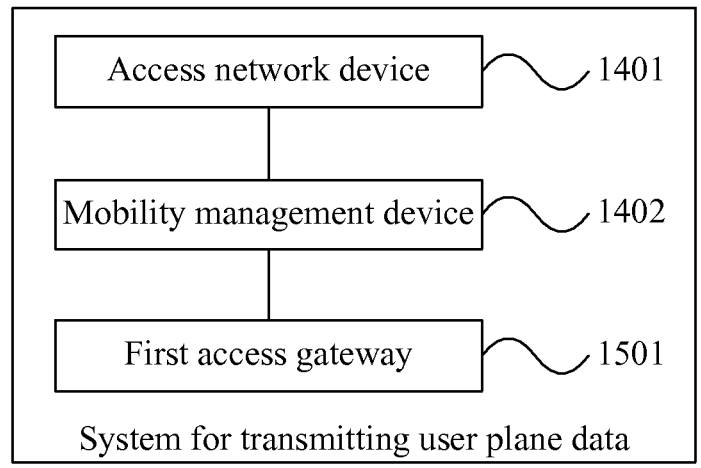
FIG. 15 is a schematic structural diagram of a system for transmitting user plane data according to a fifteenth embodiment of the present invention.

FIG. 15 is a schematic structural diagram of a system for transmitting user plane data according to a fifteenth embodiment of the present invention. Compared with the fourteenth embodiment of the present invention, as shown in FIG. 15, the system for transmitting user plane data according to this embodiment may further include a first access gateway 1501, configured to receive a user plane IP data packet, and send the user plane IP data packet to a mobility management device 1402; correspondingly, the mobility management device 1402 may be specifically configured to receive a connection establishment request message sent by an access network device 1401, establish a signaling connection with a UE according to the connection establishment request message, and transmit the user plane IP data packet through the signaling connection according to the user plane IP data packet.

In this embodiment, when the UE in an idle state performs an MT SMS service, no signaling message interaction needs to be performed between the mobility management device and the first access gateway to establish (recover) a radio interface side user plane bearer, that is, an RAB, between the UE and the first access gateway, and after selecting a signaling connection mode, the first access gateway directly sends a received downlink user plane IP data packet carrying MT SMS content to the mobility management device, and the mobility management device buffers the downlink user plane IP data packet, and pages the UE. After the mobility management device establishes a signaling connection between the paged UE in the idle state and the mobility management device, the mobility management device may directly send the downlink user plane IP data packet carrying the MT SMS content to the UE through the signaling connection, with no need to specifically recover (establish) a radio interface side user plane bearer, that is, an RAB, between the UE and the network side, that is, the first access gateway, which can save radio resources and the signaling overhead, thus reducing the network load and lowering the operating cost of an operator.

Figure 16:
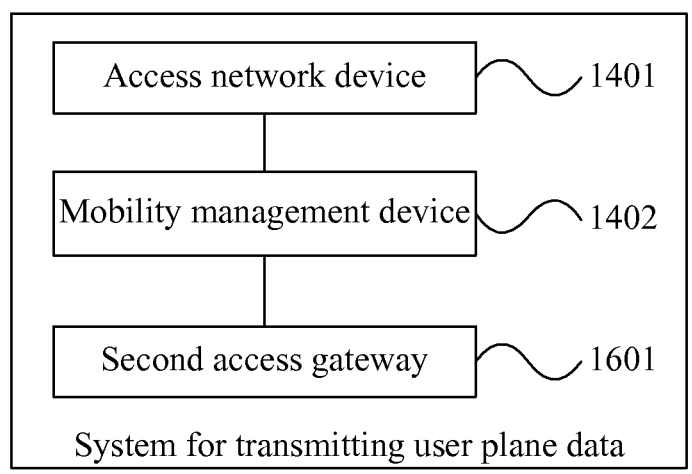
FIG. 16 is a schematic structural diagram of a system for transmitting user plane data according to a sixteenth embodiment of the present invention.

FIG. 16 is a schematic structural diagram of a system for transmitting user plane data according to a sixteenth embodiment of the present invention. Compared with the fourteenth embodiment of the present invention, as shown in FIG. 16, the system for transmitting user plane data according to this embodiment may further include a second access gateway 1601, configured to buffer a received user plane IP data packet, and send a downlink data notification message to the mobility management device 1402, where the downlink data notification message includes indication information indicating that a user plane IP data packet is transmitted through a signaling connection; correspondingly, the mobility management device 1402 may be specifically configured to page a UE according to the received downlink data notification message to trigger the UE to send a connection establishment request message, receive the connection establishment request message sent by the access network device 1401, establish a signaling connection with the UE according to the connection establishment request message, and transmit, according to the indication information included in the downlink data notification message, through the signaling connection a received user plane IP data packet sent by the second access gateway 1601.

In this embodiment, when the UE in an idle state performs an MT SMS service, no signaling message interaction needs to be performed between the mobility management device and the second access gateway to establish (recover) a radio interface side user plane bearer, that is, an RAB, between the UE and the second access gateway, and after selecting a signaling connection mode, the second access gateway buffers the received downlink user plane IP data packet, and instructs the mobility management device to page the UE and instructs the mobility management device to transmit a user plane IP data packet through a signaling connection. After the mobility management device establishes a signaling connection between the paged UE in the idle state and the mobility management device, the second access gateway sends the buffered downlink user plane IP data packet carrying the MT SMS content to the mobility management device, and the mobility management device directly sends the downlink user plane IP data packet to the UE through the signaling connection, with no need to specifically recover (establish) a radio interface side user plane bearer, that is, an RAB, between the UE and the network side, that is, the second access gateway, which can save radio resources and the signaling overhead, thus reducing the network load and lowering the operating cost of an operator.

Figure 17:
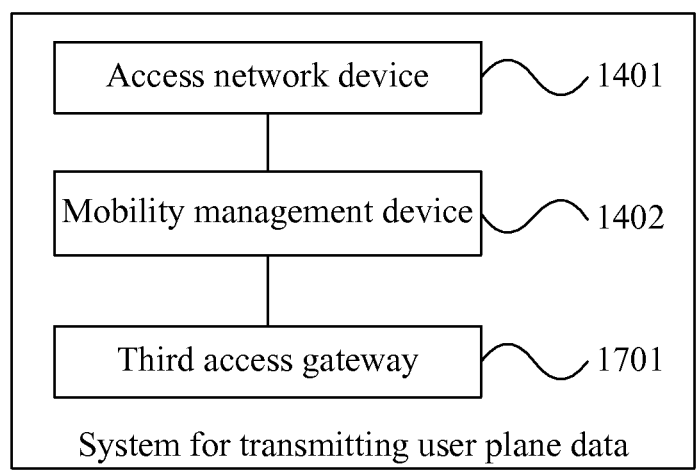
FIG. 17 is a schematic structural diagram of a system for transmitting user plane data according to a seventeenth embodiment of the present invention.

FIG. 17 is a schematic structural diagram of a system for transmitting user plane data according to a seventeenth embodiment of the present invention. Compared with the fourteenth embodiment of the present invention, as shown in FIG. 17, the system for transmitting user plane data according to this embodiment may further include a third access gateway 1701, configured to buffer a received user plane IP data packet, and send a downlink data notification message to a mobility management device 1402; correspondingly, the mobility management device 1402 may be specifically configured to page a UE according to the received downlink data notification message to trigger the UE to send a connection establishment request message, receive the connection establishment request message sent by an access network device 1401, establish a signaling connection with the UE according to the connection establishment request message, send a downlink data delivery notification message to the third access gateway 1701, where the downlink data delivery notification message includes indication information indicating that a user plane IP data packet is transmitted through a signaling connection, and transmit through the signaling connection a received user plane IP data packet sent by the third access gateway 1701.

In this embodiment, when the UE in an idle state performs an MT SMS service, no signaling message interaction needs to be performed between the mobility management device and the third access gateway to establish (recover) a radio interface side user plane bearer, that is, an RAB, between the UE and the third access gateway, and the third access gateway buffers the received downlink user plane IP data packet, and instructs the mobility management device to page the UE. After the mobility management device selects a signaling connection mode, and after the mobility management device establishes a signaling connection between the paged UE in the idle state and the mobility management device, the third access gateway is instructed to send the downlink user plane IP data packet to the mobility management device, so that the mobility management device directly sends the downlink user plane IP data packet to the UE through the signaling connection, with no need to specifically recover (establish) a radio interface side user plane bearer, that is, an RAB, between the UE and the network side, that is, the third access gateway, which can save radio resources and the signaling overhead, thus reducing the network load and lowering the operating cost of an operator.

Further, the mobility management device 1402 in the systems for transmitting user plane data provided in the fourteenth embodiment of the present invention, the fifteenth embodiment of the present invention, the sixteenth embodiment of the present invention and the seventeenth embodiment of the present invention may be further configured to negotiate with the UE about whether to support the signaling connection mode, that is, transmitting a user plane IP data packet through a signaling connection, by an attach process or a tracking area update process.

In this embodiment, if some UEs do not support the signaling connection mode, or a network side does not support the signaling connection mode although the UE supports the signaling connection mode, the mobility management device may negotiate with the UE in advance to determine whether to support the signaling connection mode of transmitting a user plane IP data packet through a signaling connection for a certain service, where specifically, the negotiation may be implemented through an attach process or a TAU process. If it is determined to support the signaling connection mode of transmitting a user plane IP data packet through a signaling connection for a certain service, the UE or the network side may select a signaling connection mode respectively for the service in subsequent processes; if it is determined not to support the signaling connection mode of transmitting a user plane IP data packet through a signaling connection for a certain service, the UE or the network side can only select a conventional user plane bearer mode of transmitting user plane data through a user plane bearer for the service in subsequent processes.

Persons of ordinary skill in the art may understand that all or part of the steps of the foregoing method embodiments may be implemented by a program instructing relevant hardware. The program may be stored in a computer readable storage medium. When the program runs, the steps of the foregoing method embodiments are performed. The storage medium may be any medium that is capable of storing program codes, such as a ROM, a RAM, a magnetic disk, or a compact disk.

Finally, it should be noted that the foregoing embodiments are merely provided for describing the technical solutions of the present invention, but not intended to limit the present invention. It should be understood by persons of ordinary skill in the art that although the present invention has been described in detail with reference to the foregoing embodiments, modifications may still be made to the technical solutions described in the foregoing embodiments, or equivalent replacements may still be made to some technical features in the technical solutions; however, such modifications or replacements do not make the nature of the corresponding technical solutions depart from the spirit and scope of the embodiments of the present invention.

What is claimed is:

1. A method for transmitting user plane data, comprising:
   receiving a connection establishment request message sent by a user equipment, wherein the connection establishment request message comprises indication information indicating that only a signaling connection is established and a radio interface side user plane bearer is not established;
   establishing a signaling connection with the user equipment according to the connection establishment request message, wherein the signaling connection is used to transmit user plane IP data packet; and
   transmitting through the signaling connection a user plane IP data packet sent by the user equipment.

2. The method according to claim 1, wherein the IP data packet is transmitted in a signaling message, and the signaling message further comprises a user plane data stream identification corresponding to the user plane IP data packet.

3. The method according to claim 1, wherein the connection establishment request message comprises indication information indicating that only a signaling connection is established instead of a radio interface side user plane bearer, and
   the transmitting the user plane IP data packet through the signaling connection comprises:
   transmitting through the signaling connection the user plane IP data packet sent by the user equipment.

4. The method according to claim 1, wherein before the receiving the connection establishment request message sent by the user equipment, the method further comprises:
   buffering a received user plane IP data packet sent by an access gateway; and
   paging the user equipment to trigger the user equipment to send the connection establishment request message; and
   the transmitting the user plane IP data packet through the signaling connection comprises:
   transmitting the user plane IP data packet through the signaling connection according to the user plane IP data packet.

5. The method according to claim 1, wherein before the receiving the connection establishment request message sent by the user equipment, the method further comprises:
   receiving a downlink data notification message sent by an access gateway, wherein the downlink data notification message comprises indication information indicating that a user plane IP data packet is transmitted through a signaling connection; and
   paging the user equipment to trigger the user equipment to send the connection establishment request message; and
   the transmitting the user plane IP data packet through the signaling connection comprises:
   transmitting, according to the indication information, through the signaling connection a received user plane IP data packet sent by the access gateway.

6. The method according to claim 1, wherein before the receiving the connection establishment request message sent by the user equipment, the method further comprises:
   receiving a downlink data notification message sent by an access gateway; and
   paging the user equipment to trigger the user equipment to send the connection establishment request message;
   after the establishing the signaling connection with the user equipment, the method further comprises:
   sending a downlink data delivery notification message to the access gateway, wherein the downlink data delivery notification message comprises indication information indicating that a user plane IP data packet is transmitted through a signaling connection; and
   the transmitting the user plane IP data packet through the signaling connection comprises:
   transmitting through the signaling connection a received user plane IP data packet sent by the access gateway.

7. The method according to claim 6, wherein the indication information is sent according to an attribute parameter of a user plane service data stream or an attribute parameter of a user plane bearer.

8. The method according to claim 1, wherein before the receiving the connection establishment request message sent by the user equipment, the method further comprises:
   negotiating with the user equipment about whether to support transmitting a user plane IP data packet through a signaling connection through an attach process or a tracking area update process.

9. A mobility management device, comprising:
a first receiving module, configured to receive a connection establishment request message sent by a user equipment, wherein the connection establishment request message comprises indication information indicating that only a signaling connection is established and a radio interface side user plane bearer is not established;
an establishing module, configured to establish a signaling connection with the user equipment according to the connection establishment request message, wherein the signaling connection is used to transmit user plane IP data packet; and
a first transmitting module, configured to transmit through the signaling connection a user plane IP data packet sent by the user equipment.

10. The mobility management device according to claim 9, wherein the connection establishment request message comprises indication information indicating that only a signaling connection is established instead of a radio interface side user plane bearer, and the first transmitting module is configured to transmit through the signaling connection the user plane IP data packet sent by the user equipment.

11. The mobility management device according to claim 9, further comprising:
a first buffer module, configured to buffer a received user plane IP data packet sent by an access gateway; and
a first trigger module, configured to page the user equipment according to the user plane IP data packet to trigger the user equipment to send the connection establishment request message;
wherein the first transmitting module is configured to transmit the user plane IP data packet through the signaling connection according to the user plane IP data packet.

12. The mobility management device according to claim 9, further comprising a second trigger module, configured to page the user equipment according to a received downlink data notification message sent by an access gateway to trigger the user equipment to send the connection establishment request message, wherein the downlink data notification message comprises indication information indicating that a user plane IP data packet is transmitted through a signaling connection;
wherein the first transmitting module is specifically configured to transmit, according to the indication information, through the signaling connection a received user plane IP data packet sent by the access gateway.

13. The mobility management device according to claim 9, further comprising:
a third trigger module, configured to page the user equipment according to a received downlink data notification message sent by an access gateway to trigger the user equipment to send the connection establishment request message; and
a notification module, configured to send a downlink data delivery notification message to the access gateway after the establishing module establishes the signaling connection with the user equipment, wherein the downlink data delivery notification message comprises indication information indicating that a user plane IP data packet is transmitted through a signaling connection;
wherein the first transmitting module is configured to transmit through the signaling connection a received user plane IP data packet sent by the access gateway.

14. The mobility management device according to claim 9, further comprising a negotiation module, configured to negotiate with the user equipment about whether to support transmitting a user plane IP data packet through a signaling connection through an attach process or a tracking area update process.

15. A user equipment, comprising:
a request module, configured to send a connection establishment request message to a mobility management device, so that the mobility management device establishes a signaling connection with the user equipment, wherein the signaling connection is used to transmit user plane IP data packet; and
a second transmitting module, configured to transmit through the signaling connection a user plane IP data packet sent by the user equipment.

16. An access gateway, comprising:
a second receiving module and a first sending module; or, a second buffer module and a second sending module; or, a third buffer module and a third sending module;
wherein the second receiving module is configured to receive a user plane IP data packet sent by a user equipment; and
the first sending module is configured to send the user plane IP data packet sent by the user equipment to a mobility management device, so that the mobility management device establishes a signaling connection with the user equipment, wherein the signaling connection is used to transmit user plane IP data packet and transmits the user plane IP data packet through the signaling connection;
wherein the second buffer module is configured to buffer a received user plane IP data packet; and
the second sending module is configured to send a downlink data notification message to a mobility management device, wherein the downlink data notification message comprises indication information indicating that a user plane IP data packet is transmitted through a signaling connection, so as to page a user equipment and trigger the user equipment to send a connection establishment request message, wherein the connection establishment request message comprises indication information indicating that only a signaling connection is established and a radio interface side user plane bearer is not established; and send the user plane IP data packet to the mobility management device after the mobility management device establishes a signaling connection with the user equipment according to the connection establishment request message, wherein the signaling connection is used to transmit user plane IP data packet, so that the mobility management device transmits the user plane IP data packet through the signaling connection;
wherein the third buffer module is configured to buffer a received user plane IP data packet; and
the third sending module is configured to send a downlink data notification message to a mobility management device, so as to page a user equipment and trigger the user equipment to send a connection establishment request message; and send the user plane IP data packet to the mobility management device according to a received downlink data delivery notification message sent by the mobility management device after the mobility management device establishes a signaling connection with the user equipment according to the connection establishment request message, wherein the signaling connection is used to transmit user plane IP data packet, wherein the downlink data delivery notification message comprises indication information indicating that a user plane IP data packet is transmitted through a signaling connection, so that the mobility management device transmits the user plane IP data packet through the signaling connection.

17. A system for transmitting user plane data, comprising:
an access network device, configured to receive a connection establishment request message sent by a user equipment, and send the connection establishment request message, wherein the connection establishment request message comprises indication information indicating that only a signaling connection is established and a radio interface side user plane bearer is not established; and
a mobility management device, configured to receive the connection establishment request message sent by the access network device, establish a signaling connection with the user equipment according to the connection establishment request message, wherein the signaling connection is used to transmit user plane IP data packet, and transmit through the signaling connection a user plane IP data packet sent by the user equipment.

18. The system according to claim 17, wherein the connection establishment request message comprises indication information indicating that only a signaling connection is established instead of a radio interface side user plane bearer, and the mobility management device is configured to receive the connection establishment request message sent by the access network device, establish a signaling connection with the user equipment according to the connection establishment request message, and transmit through the signaling connection the user plane IP data packet sent by the user equipment.

19. The system according to claim 17, further comprising a first access gateway, a second access gateway or a third access gateway;
wherein the first access gateway is configured to receive a user plane IP data packet, and send the user plane IP data packet to the mobility management device;
wherein the mobility management device is configured to receive the connection establishment request message sent by the access network device, establish a signaling connection with the user equipment according to the connection establishment request message, and transmit the user plane IP data packet through the signaling connection according to the user plane IP data packet;
wherein the second access gateway is configured to buffer a received user plane IP data packet, and send a downlink data notification message to the mobility management device, wherein the downlink data notification message comprises indication information indicating that a user plane IP data packet is transmitted through a signaling connection;
wherein the mobility management device is configured to, according to the received downlink data notification message, page the user equipment to trigger the user equipment to send the connection establishment request message, receive the connection establishment request message sent by the access network device, establish a signaling connection with the user equipment according to the connection establishment request message, and transmit, according to the indication information, through the signaling connection a received user plane IP data packet sent by the second access gateway;
wherein the third access gateway is configured to buffer a received user plane IP data packet, and send a downlink data notification message to the mobility management device;
wherein the mobility management device is configured to, according to the received downlink data notification message, page the user equipment to trigger the user equipment to send the connection establishment request message, receive the connection establishment request message sent by the access network device, establish a signaling connection with the user equipment according to the connection establishment request message, send a downlink data delivery notification message to the third access gateway, wherein the downlink data delivery notification message comprises indication information indicating that a user plane IP data packet is transmitted through a signaling connection, and transmit through the signaling connection a received user plane IP data packet sent by the third access gateway.

20. The system according to claim 19, wherein the mobility management device is further configured to negotiate with the user equipment about whether to support transmitting a user plane IP data packet through a signaling connection through an attach process or a tracking area update process.

* * * * *